(12) United States Patent
McGrath et al.

(10) Patent No.: US 11,683,229 B2
(45) Date of Patent: *Jun. 20, 2023

(54) METHODS, SYSTEMS, ARTICLES OF MANUFACTURE AND APPARATUS TO COORDINATE A NODE LEVEL ADAPTATION

(71) Applicant: Intel Corporation, Santa Clara, CA (US)

(72) Inventors: Michael McGrath, Virginia (IE); Keith Nolan, Mullingar (IE); Heather King, Kildare (IE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,789

(22) Filed: May 20, 2022

(65) Prior Publication Data

US 2022/0353141 A1 Nov. 3, 2022

Related U.S. Application Data

(63) Continuation of application No. 17/161,165, filed on Jan. 28, 2021, now Pat. No. 11,343,147, which is a
(Continued)

(51) Int. Cl.
*G06F 15/177* (2006.01)
*H04L 41/0823* (2022.01)
(Continued)

(52) U.S. Cl.
CPC ...... *H04L 41/0823* (2013.01); *G05B 19/0426* (2013.01); *H04L 41/0654* (2013.01);
(Continued)

(58) Field of Classification Search
CPC ................. H04L 41/0823; H04L 41/0816
See application file for complete search history.

(56) References Cited

U.S. PATENT DOCUMENTS

| 10,938,656 B2 | 3/2021 | McGrath et al. |
| 11,343,147 B2 | 3/2022 | McGrath et al. |
| | (Continued) | |

OTHER PUBLICATIONS

United States Patent and Trademark Office, "Non-Final Office Action," dated May 22, 2020 in connection with U.S. Appl. No. 16/234,051, 13 pages.
(Continued)

*Primary Examiner* — Padma Mundur
(74) *Attorney, Agent, or Firm* — Hanley, Flight & Zimmerman, LLC

(57) ABSTRACT

Methods, apparatus, systems and articles of manufacture are disclosed to coordinate node level adaptations. An example apparatus includes an adaptation support determiner to determine if an adaptation in an adaptation message is supported by a first device, an extractor to, in response to the determination that the adaptation in the adaptation message is supported by the first device, calculate a start-time for the first device based on (a) a transit duration of the adaptation message, (b) an execution duration of the adaptation in the adaptation message, and (c) a timestamp of when the second device sent the adaptation message, and an initiate a timer value for the first device and the second device, the timer value being a function of the start-time. The example apparatus further includes an installer to, in response to the timer value satisfying a threshold, execute the adaptation to reduce disruptions in the CPS.

35 Claims, 11 Drawing Sheets

Related U.S. Application Data continuation of application No. 16/234,051, filed on Dec. 27, 2018, now Pat. No. 10,938,656.

(51) Int. Cl.
    *G05B 19/042*    (2006.01)
    *H04L 41/0654*   (2022.01)
    *H04L 41/0816*   (2022.01)
    *H04L 41/16*     (2022.01)

(52) U.S. Cl.
    CPC   *G05B 2219/25124* (2013.01); *H04L 41/0816* (2013.01); *H04L 41/16* (2013.01)

(56) References Cited

U.S. PATENT DOCUMENTS

| | | | | |
|---|---|---|---|---|
| 2006/0239218 | A1* | 10/2006 | Weis | H04L 63/1458 370/312 |
| 2007/0291750 | A1* | 12/2007 | Nylander | H04W 8/26 370/389 |
| 2012/0005490 | A1* | 1/2012 | Goraczko | G06F 1/3206 713/300 |
| 2014/0047425 | A1* | 2/2014 | Thapar | G06F 8/656 717/168 |
| 2016/0092187 | A1* | 3/2016 | Lerner | G06F 8/61 717/178 |
| 2019/0132204 | A1 | 5/2019 | McGrath et al. | |
| 2021/0328869 | A1 | 10/2021 | McGrath et al. | |

OTHER PUBLICATIONS

United States Patent and Trademark Office, "Notice of Allowance," dated Oct. 30, 2020 in connection with U.S. Appl. No. 16/234,051, 8 pages.

United States Patent and Trademark Office, "Non-Final Office Action," dated Oct. 8, 2021 in connection with U.S. Appl. No. 17/161,165, 8 pages.

United States Patent and Trademark Office, "Notice of Allowance," dated Jan. 26, 2022 in connection with U.S. Appl. No. 17/161,165, 7 pages.

\* cited by examiner

United States Patent No. 11,683,229 B2

METHODS, SYSTEMS, ARTICLES OF MANUFACTURE AND APPARATUS TO COORDINATE A NODE LEVEL ADAPTATION

CROSS-REFERENCE TO RELATED APPLICATIONS

This patent arises from a continuation of and claims priority to U.S. patent application Ser. No. 17/161,165, filed Jan. 28, 2021 (now U.S. Pat. No. 11,343,147), entitled "METHODS, SYSTEMS, ARTICLES OF MANUFACTURE AND APPARATUS TO COORDINATE A NODE LEVEL ADAPTATION," and U.S. patent application Ser. No. 16/234,051, filed Dec. 27, 2018 (now U.S. Pat. No. 10,938,656), entitled "METHODS, SYSTEMS, ARTICLES OF MANUFACTURE AND APPARATUS TO COORDINATE A NODE LEVEL ADAPTATION," the contents of which is hereby incorporated in its entirety.

FIELD OF THE DISCLOSURE

This disclosure relates generally to coordinating adaptations, and, more particularly, to methods, systems, articles of manufacture and apparatus to coordinate node level adaptation.

BACKGROUND

In recent years, physical systems (e.g., manufacturing plants) include operating devices that are integrated with software components to allow for cross communication and interaction between such operating devices. These software integrated physical systems may hereinafter be referred to as cyber physical systems (CPSs). The devices in the CPSs are often in communication with each other through a respective intermediate device node (e.g., hybrid-node (H-Node), hybrid-computational device (H-computational device), or edge node) in communication with a central cloud.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
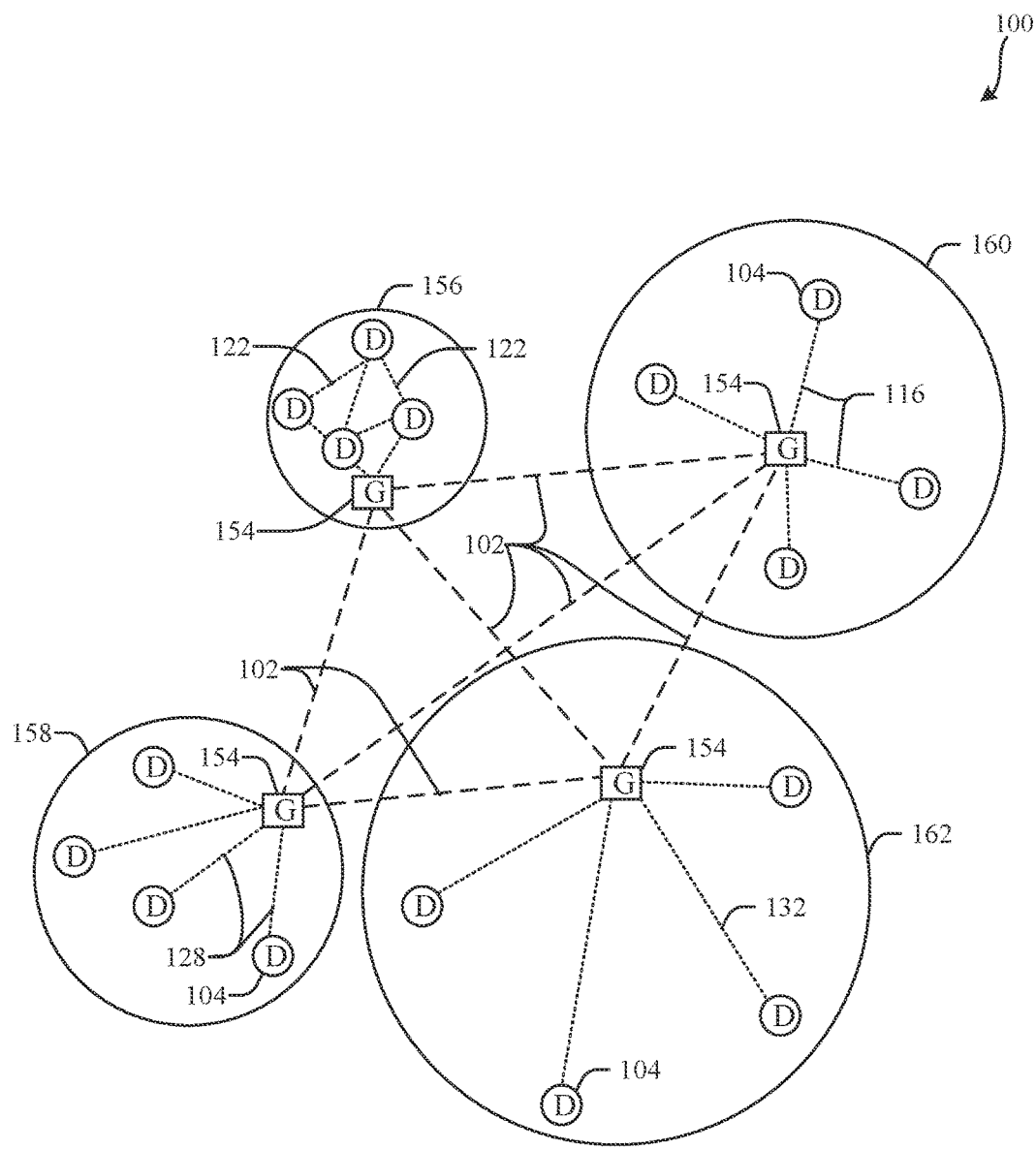
FIG. 1 illustrates a domain topology for respective internet-of-things (IoT) networks coupled through links to respective gateways, according to an example.

Physical systems of computational devices (e.g., manufacturing plants with automatic and/or semiautomatic operating devices) include operating devices that are integrated with software components. Example operating devices include manufacturing equipment, processing equipment, office equipment (e.g., printers, computers), or any other suitable software integrated physical device. Furthermore, example software components integrated in the operating devices may include device drivers, libraries, update packages, executables, system patches, etc., that may be implemented for the operating system (OS) and/or application specific software. In such physical systems there exists cross communication and interaction between such operating devices. These software integrated physical systems may hereinafter be referred to as cyber physical systems (CPSs). Example CPSs include autonomous factories, sensor-based communication-enabled autonomous systems, smart grids, medical monitoring systems, process control systems, distributed robotics, and/or automatic pilot avionics.

Operating devices in a CPS communicate in a network, typically being controlled by computer algorithms or instructions sent from other operating device nodes. In examples disclosed herein, the operating devices may be referred to as edge nodes. In addition, operating devices in a CPS communicate with other operating devices through a central cloud. Example communication may be performed wirelessly and/or through wired network communication. Additionally, in a CPS there exists an intermediate communication node (e.g., an H-node, an H-computational node, an edge node, etc.) that serves as a middle and/or otherwise intermediating link between an operating device and the central cloud. In some examples, each operating device is in communication with and/or controlled by a respective H-node. In such examples, the H-nodes may communicate directly with neighboring H-nodes.

In the event that the H-nodes are software integrated physical devices that communicate on behalf of software integrated operating devices, there are often instances of software, hardware, and/or firmware updates pushed to the H-nodes. In examples disclosed herein, the software, hardware, and/or firmware updates may be referred to as adaptations. Such adaptations attempt to modify and/or otherwise improve the operating efficiency of the operating devices in the CPS.

Typically, adaptations are pushed out to the H-nodes for respective operating devices. These adaptations may be in the form of wireless packets transmitted via wireless protocol via a central cloud or neighboring H-node, or data packets sent via wired communications. H-nodes in a CPS obtain adaptations (e.g., improvements, modifications, and/ or updates) in response to certain operational objectives (e.g., increase reliability, reduce power, increase yield, etc.) defined in the CPS. Additionally, the adaptations may originate in an adaptation engine local to a respective H-node, or from a central cloud in the CPS. In such examples, the adaptations are pushed to neighboring H-nodes for similar application.

In prior attempts to apply adaptations, the adaptations are inefficiently pushed to neighboring H-nodes. For example, if two homogenous (e.g., the same model, same software, etc.) operating devices are to obtain an adaptation, one of the homogenous operating devices obtains the adaptation first. As a result, for a period of time, the two homogenous operating devices operate using different software versions, different operating policies, etc. The varying software versions and/or operating policies lead to disruptions in a CPS. Entropy (e.g., disorder) in a CPS is heightened to an unsatisfactory and/or inefficient level when adaptions (e.g., improvements and/or updates) are pushed (e.g., sent) to an H-node, and further inefficiently propagated to surrounding H-nodes in the CPS. Example disruptions in a CPS include improper manufacturing techniques, bottlenecks, inefficient process flow, etc.

Alternatively, the above-mentioned complications may occur if an adaptation is inefficiently applied to two heterogenous (e.g., varying models, varying software, etc.) operating devices. For example, if one operating device (e.g., a piece of robotic equipment) is to obtain an adaptation relating to operation timing, and an additional operating device (e.g., a molding press) is to obtain the same adaptation, the inefficient coordination between adaptation may cause a bottleneck in the CPS.

Examples disclosed herein include coordinating adaptations and/or adaptation messages between operating devices and/or H-nodes in a CPS. Examples disclosed herein include computing a respective start-time for an originating node to apply an adaptation. The computed start-time allows for coordination between H-nodes and/or operating devices to apply adaptations in a manner that synchronizes operation(s) of operating devices, and/or reduces or minimizes disruption(s) in the CPS. In examples disclosed herein, if an adaptation is initiated by a H-node, the propagation of such adaptation to neighboring H-nodes is coordinated such that the adaptations can be applied (e.g., applied in a particular temporal order and/or schedule) without human intervention and without disruptions.

Examples disclosed herein include extracting the transit time (e.g., transit duration) of an adaptation message. Additionally, exampled disclosed herein include extracting the timestamp identifying when the adaption was sent by the originating node (e.g., the originating H-node and/or the central cloud). Furthermore, examples disclosed herein include referencing a local adaptation timing database to determine the time to complete the adaption.

In examples disclosed herein, in response to obtaining the transit time, timestamp, and/or the time to complete the adaptation from the originating node, a respective start-time is calculated for the originating node. Examples disclosed herein include transmitting to the originating node, via wireless and/or wired communication, the calculated start-time for the originating node in order to coordinate respective start-times between the originating node and the receiving node. In such a manner, the originating node is to initiate the adaptation application at the calculated start-time. Examples disclosed herein overcome the traditional fire-and-forget strategy (e.g., transmit adaptation and disregard timing conflictions) by coordinating a respective start-time for all H-nodes set to obtain the adaptation.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others (e.g., enabling adaptation control and/or management), in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
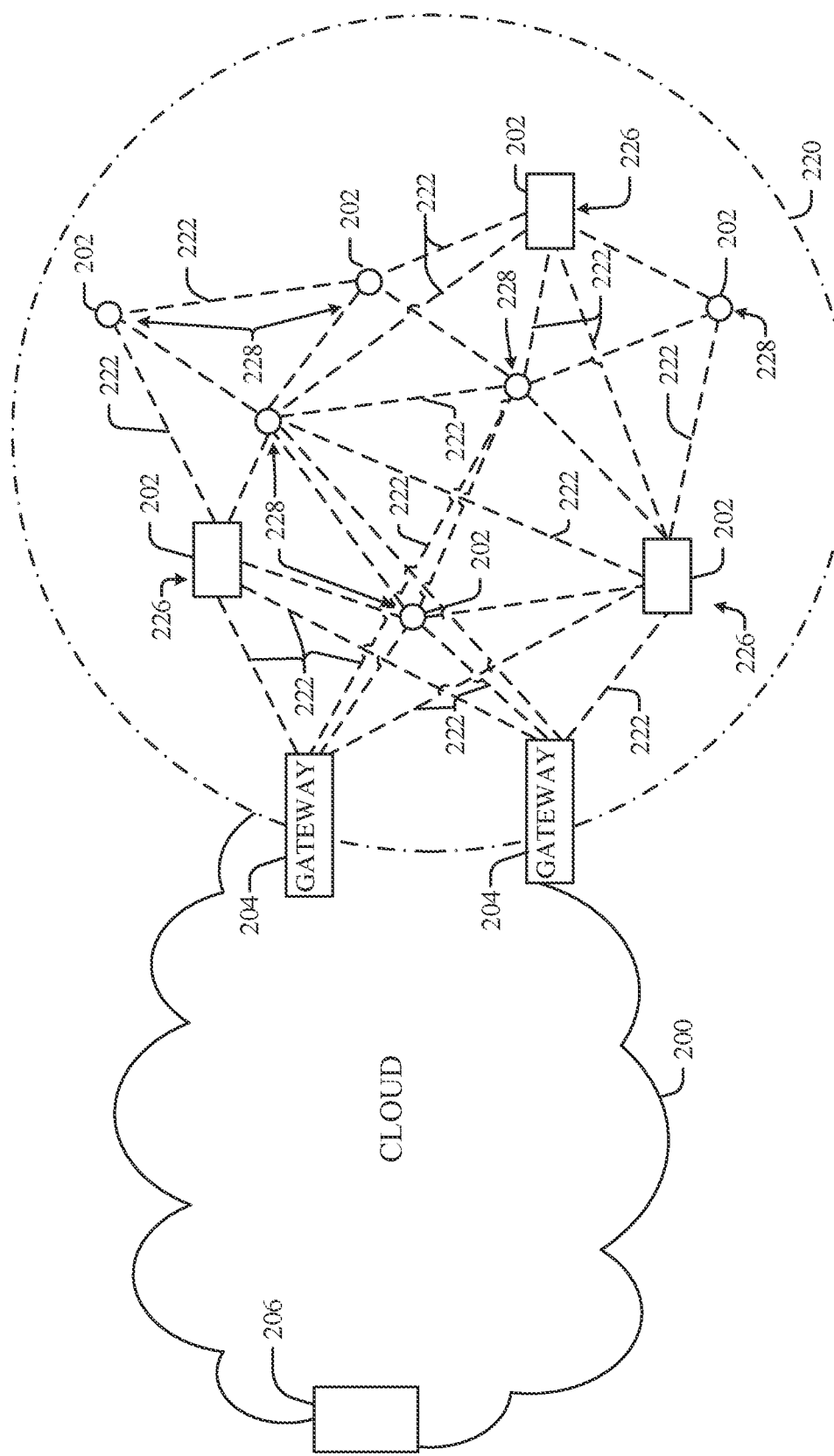
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity including a combination of wired and wireless technologies.

FIG. 1 specifically provides a simplified drawing of a domain topology 100 that may be used for a number of internet-of-things (IoT) networks including IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing of FIG. 1, not every IoT device 104, or communications link (e.g., link 116, 122, 128, or 132) is labeled. The backbone links 102 of FIG. 1 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The domain topology 100 of FIG. 1 may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Example IoT networks provide opportunities for new technical features, such as those as described herein. The improved technologies and networks may enable the growth of devices and networks, including the use of IoT networks into as fog devices or systems. As the use of such improved technologies grows, example IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104 of FIG. 1, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156 of FIG. 1 may be enhanced by systems that perform inline data-to-information transforms. For example, self-forming chains of processing resources including a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158 of FIG. 1 may use systems that perform standards conversion to provide multi-standard connectivity, enabling IoT devices 104 using different protocols to communicate. Further systems may provide seamless interconnectivity across a multi-standard infrastructure including visible Internet resources and hidden Internet resources.

Communications in the cellular network 160 of FIG. 1 may be enhanced by systems that offload data, extend communications to more remote devices, or both. The LPWA network 162 of FIG. 1 may include systems that perform non-Internet protocol (IP) to IP interconnections, addressing, and routing. Further, each of the IoT devices 104 of FIG. 1 may include the appropriate transceiver for wide area communications with that device. Further, each IoT device 104 of FIG. 1 may include other transceivers for communications using additional protocols and frequencies. This is discussed further with respect to the communication environment and hardware of an IoT processing device depicted in FIGS. 10 and 11.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates an example cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 of FIG. 2 is labeled.

The fog 220 may be considered to be a massively interconnected network wherein a number of IoT devices 202 are in communication with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combination of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

As described above, examples disclosed herein overcome the traditional fire-and-forget strategy (e.g., transmit adaptation and disregard timing conflictions) by coordinating a respective start-time for all H-nodes set to obtain the adaptation. In the illustrated example of FIG. 3, the cyber physical system 300 includes a central cloud 302 and first, second, and third manufacturing cells 304, 306, and 308, respectively. The example manufacturing cells 304, 306, and 308 are in communication via the example central cloud 302. In some examples disclosed herein, the cyber-physical system 300 includes different numbers of manufacturing cells, operating devices, and/or any suitable device capable of communication. In some examples disclosed herein, the manufacturing cells 304, 306, and/or 308 may be on-site (e.g., at a central physical location) or off-site (e.g., at another physical location or site). Additionally, in some examples, the adaptation message 311a, 311b, and/or 311c may originate and/or occur within the manufacturing cells 304, 306, and/or 308. In such examples, the adaptation message 311a, 311b, and/or 311c may originate at any of the H-nodes (e.g., any of the H-nodes 310a, 310b, 310c, 310d, 310e, 310f, 310g, 310h, 310i, 310j, 310k, and/or 310l) or any of the operating devices (e.g., any of the operating devices 312, 314, 316, 318, 320, 322, 324, 326, 328, 330, 332, and/or 334).

Figure 3:
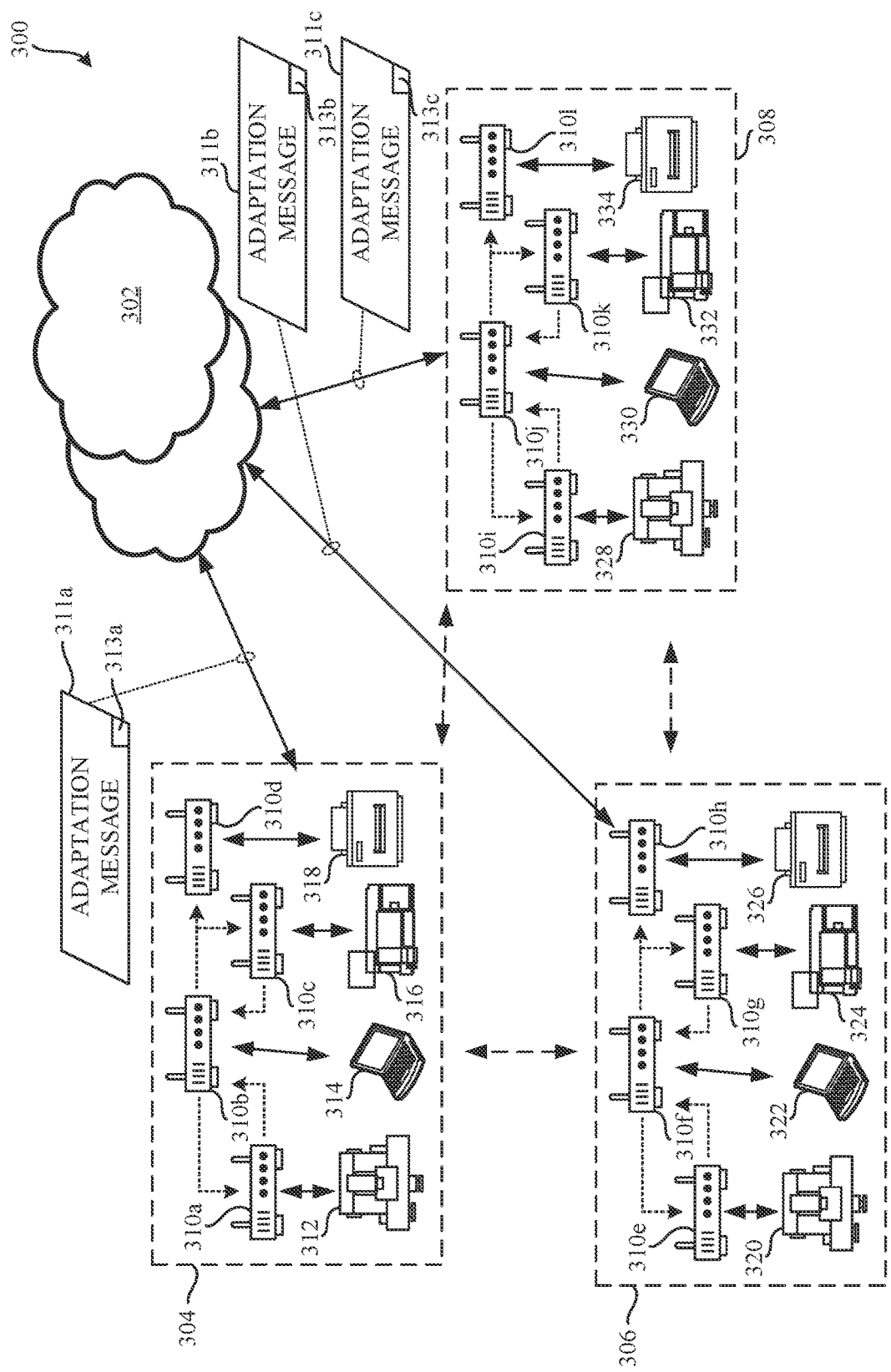
FIG. 3 is a diagram illustrating a cyber physical system in communication with a central cloud.

The example first manufacturing cell 304 of FIG. 3 is a processing cell in a manufacturing facility. However, examples disclosed herein are not limited to the first manufacturing cell 304 being a processing cell in a manufacturing facility and, for example, may be any other community of devices in which communication is possible. The first manufacturing cell 304 of FIG. 3 includes a first intermittent device node 310a, a second intermittent device node 310b, a third intermittent device node 310c, and a fourth intermittent device node 310d. While the example first manufacturing cell 304 includes four separate intermittent device nodes, examples are not limited thereto and are used herein as a matter of convenience. In some examples, the first, second, third, and fourth intermittent device nodes are collectively referred to as intermittent device nodes 310, or H-nodes 310. In examples disclosed herein, the first intermittent device node 310a, second intermittent device node 310b, third intermittent device node 310c, and fourth intermittent device node 310d may hereinafter be referred to as H-nodes 310a, 310b, 310c, and 310d or H-computational nodes 310a, 310b, 310c, and 310d, respectively. Furthermore, the example first manufacturing cell 304 includes a first operating device 312, a second operating device 314, a third operating device 316, and a fourth operating device 318 (e.g., manufacturing equipment, cellular equipment, monitoring devices, etc.). While the example first manufacturing cell 304 includes four separate operating devices, examples are not limited thereto and are used herein as a matter of convenience.

The example H-nodes 310a, 310b, 310c, and 310d are in communication with the example operating devices 312, 314, 316, and 318, respectively. In examples disclosed herein, the H-nodes 310a, 310b, 310c, and 310d may be implemented as an industrial personal computer (IPC) or any other suitable device capable of serving as an intermittent link between the example cloud 302 and a respective device (e.g., the operating devices 312, 314, 316, and/or 318). The example H-nodes 310a, 310b, 310c, and/or 310d may include custom software written for each operating device 312, 314, 316, and/or 318, respectively. In examples disclosed herein, the H-nodes 310a, 310b, 310c, and/or 310d obtain, receive, retrieve, and/or interpret an adaptation message 311a sent via the central cloud 302.

The example second manufacturing cell 306 of FIG. 3 is a processing cell in a manufacturing facility. However, examples disclosed herein are not limited to the second manufacturing cell 306 being a processing cell in a manufacturing facility and, for example, may be any other community of devices in which communication is possible. The second manufacturing cell 306 of FIG. 3 includes a first intermittent device node 310e, a second intermittent device node 310f, a third intermittent device node 310g, and a fourth intermittent device node 310h. While the example second manufacturing cell 306 includes four separate intermittent device nodes, examples are not limited thereto and are used herein as a matter of convenience. In some examples, the first, second, third, and fourth intermittent device nodes are collectively referred to as intermittent device nodes 310, or H-nodes 310. In examples disclosed herein, the first intermittent device node 310e, second intermittent device node 310f, third intermittent device node 310g, and fourth intermittent device node 310h may hereinafter be referred to as H-nodes 310e, 310f, 310g, and 310h or H-computational nodes 310e, 310f, 310g, and 310h, respectively. Furthermore, the example second manufacturing cell 306 includes a first operating device 320, a second operating device 322, a third operating device 324, and a fourth operating device 326 (e.g., manufacturing equipment, cellular equipment, monitoring devices, etc.). While the example second manufacturing cell 306 includes four separate operating devices, examples are not limited thereto and are used herein as a matter of convenience.

The example H-nodes 310e, 310f, 310f, and 310h are in communication with the example operating devices 320, 322, 324, and 326, respectively. In examples disclosed herein, the H-nodes 310e, 310f, 310g, and 310h may be implemented as an industrial personal computer (IPC) or any other suitable device capable of serving as an intermittent link between the example cloud 302 and a respective device (e.g., the operating devices 320, 322, 324, and/or 326). The example H-nodes 310e, 310f, 310g, and/or 310h may include custom software written for each operating device 320, 322, 324, and/or 326, respectively. In examples disclosed herein, the H-nodes 310e, 310f, 310g, and/or 310h obtain, receive, retrieve, and/or interpret an adaptation message 311b sent via the central cloud 302.

The example third manufacturing cell 308 of FIG. 3 is a processing cell in a manufacturing facility. However, examples disclosed herein are not limited to the third manufacturing cell 308 being a processing cell in a manufacturing facility and, for example, may be any other community of devices in which communication is possible. The third manufacturing cell 308 of FIG. 3 includes a first intermittent device node 310i, a second intermittent device node 310j, a third intermittent device node 310k, and a fourth intermittent device node 310l. While the example third manufacturing cell 308 includes four separate intermittent device nodes, examples are not limited thereto and are used herein as a matter of convenience. In some examples, the first, second, third, and fourth intermittent device nodes are collectively referred to as intermittent device nodes 310, or H-nodes 310. In examples disclosed herein, the first intermittent device node 310i, second intermittent device node 310j, third intermittent device node 310k, and fourth intermittent device node 310l may hereinafter be referred to as H-nodes 310i, 310j, 310k, and 310l or H-computational nodes 310i, 310j, 310k, and 310l, respectively. Furthermore, the example third manufacturing cell 308 includes a first operating device 328, a second operating device 330, a third operating device 332, and a fourth operating device 334 (e.g., manufacturing equipment, cellular equipment, monitoring devices, etc.). While the example third manufacturing cell 308 includes four separate operating devices, examples are not limited thereto and are used herein as a matter of convenience.

The example H-nodes 310i, 310j, 310k, and 310l are in communication with the example operating devices 328, 330, 332, and 334, respectively. In examples disclosed herein, the H-nodes 310i, 310j, 310k, and 310l may be implemented as industrial personal computer (IPC) or any other suitable device capable of serving as an intermittent link between the example cloud 302 and a respective device (e.g., the operating devices 328, 330, 332, and/or 334). The example H-nodes 310i, 310j, 310k, and/or 310l may include custom software written for each operating device 328, 330, 332, and/or 334, respectively. In examples disclosed herein, the H-nodes 310i, 310j, 310k, and/or 310l obtain, receive, retrieve, and/or interpret an adaptation message 311c sent via the central cloud 302.

The example adaptation message 311a includes an adaptation to be applied by the H-nodes 310a, 310b, 310c, and/or 310d. In examples disclosed herein, the adaptation message 311a is originally intended for the example first manufacturing cell 304, but may be communicated to the manufacturing cells 306 and/or 308 for similar application. Furthermore, in examples disclosed herein, the adaptation message 311a may be initiated in an automatic manner in response to an external disturbance (e.g., loss of power or damaged a damaged operational device 312, 314, 316, and/or 318), a change in an operational objective (e.g., a modified manufacturing process), and/or an optimization initiative (e.g., a reduction in resource usage or a reduction in operating time) for the operational devices 312, 314, 316, and/or 318.

Likewise, the example adaptation message 311b includes an adaptation to be applied by the H-nodes 310e, 310f, 310g, and/or 310h. In examples disclosed herein, the adaptation message 311b is originally intended for the example first manufacturing cell 306, but may be communicated to the manufacturing cells 304 and/or 308 for similar application. Furthermore, in examples disclosed herein, the adaptation message 311b may be initiated in an automatic manner in response to an external disturbance (e.g., loss of power or damaged a damaged operational device 320, 322, 324, and/or 326), a change in an operational objective (e.g., a modified manufacturing process), and/or an optimization initiative (e.g., a reduction in resource usage or a reduction in operating time) for the operational devices 320, 322, 324, and/or 326.

Additionally, the example adaptation message 311c includes an adaptation to be applied by the H-nodes 310i, 310j, 310k, and/or 310l. In examples disclosed herein, the adaptation message 311c is originally intended for the example first manufacturing cell 308, but may be communicated to the manufacturing cells 304 and/or 306 for similar application. Furthermore, in examples disclosed herein, the adaptation message 311c may be initiated in an automatic manner in response to an external disturbance (e.g., loss of power or damaged a damaged operational device 328, 330, 332, and/or 334), a change in an operational objective (e.g., a modified manufacturing process), and/or an optimization initiative (e.g., a reduction in resource usage or a reduction in operating time) for the operational devices 328, 330, 332, and/or 334.

The example operational devices of FIG. 3 (e.g., the first operational device 312, the second operational device 314, the third operational device 316, and the fourth operational device 318 of the first manufacturing cell 304, the first operational device 320, the second operational device 322, the third operational device 324, and the fourth operational device 326 of the second manufacturing cell 306, and/or the first operational device 328, the second operational device 330, the third operational device 332, and the fourth operational device 334 of the third manufacturing cell 308) obtain, receive, retrieve, and/or transmit data indicating respective operating conditions to the example H-nodes (e.g., 310a, 310b, 310c, 310d, 310e, 310f, 310g, 310h, 310i, 310j, 310k, and/or 310l respectively). In examples disclosed herein, the operational devices 312, 314, 316, 318, 320, 322, 324, 326, 328, 330, 332, and/or 334 may be manufacturing process equipment, office electronics, or any other suitable device capable of communicating with a respective H-node (e.g., the H-nodes 310a, 310b, 310c, 310d, 310e, 310f, 310g, 310h, 310i, 310j, 310k, and/or 310l).

Figure 4:
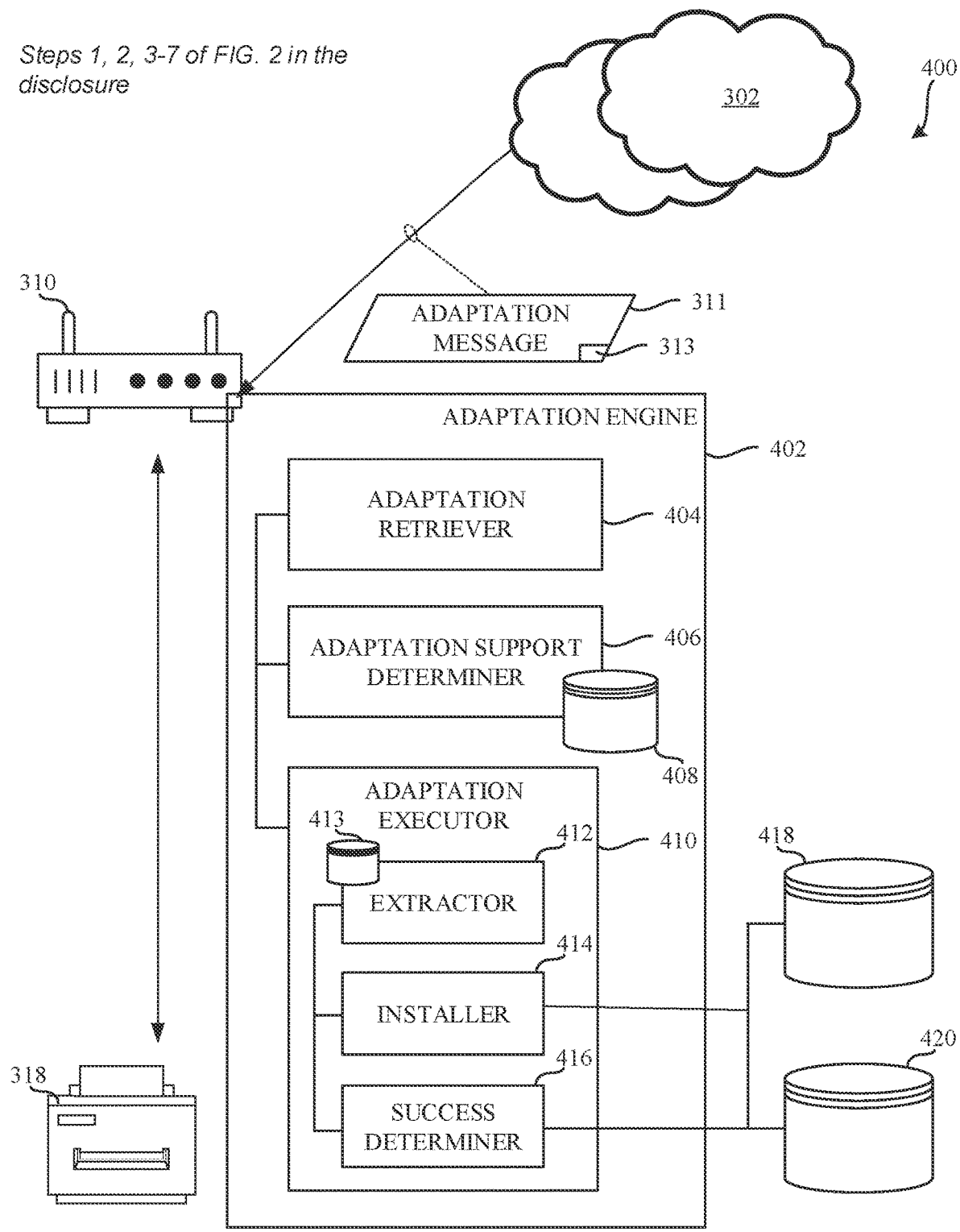
FIG. 4 is a block diagram illustrating an example adaptation engine to apply the adaptation message to the operating device of FIG. 3.

FIG. 4 is a block diagram 400 illustrating an example adaptation engine 402 to apply the example adaptation message 311 to the example operational device 318 of FIG. 3. The example H-node 310 illustrated in FIG. 4 represents any of the H-nodes 310a, 310b, 310c, 310d, 310e, 310f, 310g, 310h, 310i, 310j, 310k, and/or 310l of FIG. 3. Likewise, the example adaptation message 311 illustrated in FIG. 4 may represent any of the adaptation messages 311a, 311b, and/or 311c of FIG. 3. The example adaptation engine 402 includes an example adaptation retriever 404, an example adaptation support determiner 406, an example adaptation database 408, and an example adaptation executor 410. Furthermore, the example adaptation executor 410 of FIG. 4 includes an example extractor 412, an example installer 414, and an example success determiner 416.

In the illustrated example of FIG. 4, the example adaptation support determiner 406 is a means for determining, or a determining means. In the illustrated example of FIG. 4, the example extractor 412 is a means for controlling a timer, a means for timer control, a controlling means, or a timer control means. In the illustrated example of FIG. 4, the example installer 414 is a means for installing or an installing means. In the illustrated example of FIG. 4, the example success determiner 416 is a means for notifying, a means for determining success, a notifying means, or a success determining means.

The example adaptation retriever 404 initially causes the adaptation engine 402 to enter a waiting state. In some examples disclosed herein, the adaptation retriever 404 checks (e.g., checks periodically, continuously, aperiodically on a scheduled basis, etc.) to determine if the example adaptation message 311 is sent to the H-node 310 via a network (e.g., the central cloud 302 of FIG. 3). The example adaptation retriever 404 may be structured as a software listener to enter into a waiting state to determine if the adaptation message 311 is sent to the H-node 310 via the central cloud 302. In some examples, the adaptation retriever 404 may be structured as a software listener to enter into a waiting state to determine if the adaptation message is sent to the H-node 310 via another H-node (e.g., and of the H-nodes 310a, 310b, 310c, 310d, 310e, 310f, 310g, 310h, 310i, 310j, 310k, and/or 310l).

In response to the adaptation message 311 being sent to the H-node, the example adaptation retriever 404 processes the adaptation message (e.g., extracts and interprets the incoming data and/or payload). In some examples, the adaption retriever 404 organizes, stores, and/or performs any suitable analysis to process the adaption message 311.

The example adaptation support determiner 406 determines if the adaptation message 311 includes an adaptation 313 therein that is supported by the operating device 318. In In some examples, the adaption support determiner 406 is in communication with the example adaptation database 408 to determine whether the operating device 318 can support the adaptation 313 (e.g., whether the operating device 318 is compatible with the adaptation 313). For example, the adaptation support determiner 406 may cross-check the version of the adaptation 313 against the adaptation database 408 to determine if the adaptation 313 can be applied (e.g., if the version of the adaptation 313 is compatible with versions stored in the adaptation database 408). Additionally, the example adaption support determiner 406 verifies the adaptation message 311 to determine whether or not the adaptation message 311 is valid. In some examples disclosed herein, the adaptation support determiner 406 verifies the security of the adaptation message 311 (e.g., verifies the validity of the sender, verify the adaptation message 311 is/was generated from a trusted source and/or sender, etc.).

The example adaptation database 408 may be implemented as an internal or external lookup table, volatile memory, non-volatile memory, or any other suitable apparatus to store data. The example adaptation database 408 includes data relating to suitable adaptation versions that can be applied to a respective operational device (e.g., the operational devices 312, 314, 316, 318, 320, 322, 324, 326, 328, 330, 332, and/or 334 of FIG. 3). In some examples, the adaptation database 408 includes information relating to the homogeneity between the operational devices (e.g., the operational devices 312, 314, 316, 318, 320, 322, 324, 326, 328, 330, 332, and/or 334 of FIG. 3) in the cyber physical system 300 of FIG. 3. For example, if there exist two or more homogeneous (e.g., similar model, similar operating versions, etc.) operational devices (e.g., the operational devices 318 and 326 of FIG. 3), the adaptation database 408 will contain relevant information (e.g., version, device name, device location, device status) that indicates to the adaptation support determiner 406 of a candidate and/or compatible second device that supports the adaptation 313. Alternatively, if there exist two or more heterogenous (e.g., varying models, varying operating versions, etc.) operational devices (e.g., the operational devices 318 and 324 of FIG. 3), the adaptation database 408 will contain the relevant information (e.g., version, device name, device location, device status) that indicates to the adaptation support determiner 406 of an unlikely candidate second device that supports the adaptation 313.

The example adaption executor 410 of FIG. 4 is in communication with the example adaption support determiner 406 to obtain an indication of whether the incoming adaptation message 311 includes a compatible adaptation 313 (e.g., an adaption supported by the respective operational device 318) for the respective operational device 318. The example adaption executor 410 includes the extractor 412, the installer 414, and the success determiner 416. The example extractor 412, the example installer 414, and the example success determiner 416 communicate to send, receive, and/or process data to apply, install, execute, etc., the adaptation 313 for the respective operational device 318. In some examples, the adaptation executor 410 processes (e.g., parses and/or extracts) the change in time between the originating node and the receiving node, the transit time (e.g., the transit duration), the request processing time (e.g., the time obtained from the local adaptation timing database 413), the receiving node's time, and/or the processing time of the originating node (e.g., the central cloud 302 and/or another H-node (e.g., any of the H-nodes 310a, 310b, 310c, 310d, 310e, 310f, 310g, 310h, 310i, 310j, 310k, and/or 310l of FIG. 3)).

The example extractor 412, extracts relevant information and/or parameters (e.g., metadata) from the adaptation message 311 relating to the adaptation 313 such as timestamps, transit time (e.g., transit duration from sending an adaptation of interest from the originating node to the receiving node), version information, time of install information (e.g., a duration for an install process of the adaptation that may be unique to particular types of operating devices), etc. In some examples, the above-mentioned parameters (e.g., timestamps, transit time, version information, time of install information, etc.), may be extracted by a receiving node with respect to the originating node, in which the originating node is another H-node (e.g., any of the H-nodes 310a, 310b, 310c, 310d, 310e, 310f, 310g, 310h, 310i, 310j, 310k, and/or 310*l* of FIG. 3) or an operating device (e.g., any of the operational devices 312, 314, 316, 318, 320, 322, 324, 326, 328, 330, 332, and/or 334). In some examples, the extractor 412 extracts the transit time of the adaptation message 311. For example, the extractor 412 extracts the transit time of the adaptation message 311 from the central cloud 302 to the H-node 310. In some examples, the adaptation message 311 is sent between H-nodes (e.g., any of the H-nodes 310*a*, 310*b*, 310*c*, 310*d*, 310*e*, 310*f*, 310*g*, 310*h*, 310*i*, 310*j*, 310*k*, and/or 310*l* of FIG. 3) and, therefore, the transit time extracted by the extractor 212 is the transit time between an originating H-node (e.g., any of the H-nodes 310*a*, 310*b*, 310*c*, 310*d*, 310*e*, 310*f*, 310*g*, 310*h*, 310*i*, 310*j*, 310*k*, and/or 310*l* of FIG. 3) to an additional H-node (e.g., any of the H-nodes 310*a*, 310*b*, 310*c*, 310*d*, 310*e*, 310*f*, 310*g*, 310*h*, 310*i*, 310*j*, 310*k*, and/or 310*l* of FIG. 3). In some examples, there may exist respective transit times during communications between H-nodes (e.g., any of the H-nodes 310*a*, 310*b*, 310*c*, 310*d*, 310*e*, 310*f*, 310*g*, 310*h*, 310*i*, 310*j*, 310*k*, and/or 310*l* of FIG. 3). For example, the example H-node 310*a* may obtain the adaptation message 311 from the central cloud 302. If the H-node 310 transmits the adaptation message 311 to the example H-node 310*b*, the example H-node 310*b* determines the transit time with respect to the message being sent from the H-node 310*a* to the H-node 310*b*. Furthermore, if the H-node 310*b* sends the adaptation message to the example H-node 310*c*, the example H-node 310*c* determines a second transit time with respect to the message being sent from the H-node 310*b* to the H-node 310*c*.

Additionally, the example extractor 412 of FIG. 4 also extracts the execution duration of the adaptation 313 from an example local adaptation timing database 413. Using the above-mentioned extracted timing information (e.g., the transit time with respect to the adaptation message 311 being sent from the originating node to the receiving node (e.g., the node including the extractor 412) and/or the execution duration obtained from the local adaptation database 413), the extractor 412 calculates the timestamp (e.g., the time that the adaptation message 311 was sent by the originating node) of the adaptation message 311. In some examples, the extractor 412 detects communication routes associated with the calculated timestamp. For example, the example extractor 412 calculates the time that the adaptation message 311 was sent from the originating node (e.g., the central cloud 302 or another H-node (e.g., any of the H-nodes 310*a*, 310*b*, 310*c*, 310*d*, 310*e*, 310*f*, 310*g*, 310*h*, 310*i*, 310*j*, 310*k*, and/or 310*l* of FIG. 3)). In some examples, the extractor 412 utilizes the timestamp to coordinate with other H-nodes (e.g., any of the H-nodes 310*a*, 310*b*, 310*c*, 310*d*, 310*e*, 310*f*, 310*g*, 310*h*, 310*i*, 310*j*, 310*k*, and/or 310*l* of FIG. 3) in the cyber physical system 300 to perform and/or otherwise implement the adaptation in a manner that reduces and/or otherwise minimizes disruption effects within the example CPS 300. The example extractor 412 initiates a timer value (e.g., a countdown clock determining when to execute the adaptation 313) in response to calculating the timestamp. The timer value initiated by the extractor 412 may be different for all supporting H-nodes (e.g., any of the H-nodes 310*a*, 310*b*, 310*c*, 310*d*, 310*e*, 310*f*, 310*g*, 310*h*, 310*i*, 310*j*, 310*k*, and/or 310*l* of FIG. 3) and, therefore, can be determined to coordinate installations of the adaptation 313. For example, the timer value initiated by the extractor 412 may be sent to all supporting H-nodes (e.g., any of the H-nodes 310*a*, 310*b*, 310*c*, 310*d*, 310*e*, 310*f*, 310*g*, 310*h*, 310*i*, 310*j*, 310*k*, and/or 310*l* of FIG. 3) to indicate to the respective H-node (e.g., any of the H-nodes 310*a*, 310*b*, 310*c*, 310*d*, 310*e*, 310*f*, 310*g*, 310*h*, 310*i*, 310*j*, 310*k*, and/or 310*l* of FIG. 3) to execute the adaptation 313 when the timer value expires (e.g., each of the H-nodes 310*a*, 310*b*, 310*c*, 310*d*, 310*e*, 310*f*, 310*g*, 310*h*, 310*i*, 310*j*, 310*k*, and/or 310*l* of FIG. 3 execute the adaptation 313 at a coordinated time). In such examples, the receiving H-node (e.g., the H-node obtaining the adaptation 313) halts execution of the adaptation 313 until the timer value expires.

The example installer 414 of FIG. 4 communicates with the extractor 412 to execute the adaptation 313. In some examples, the installer 414 checks (e.g., checks continuously, periodically, aperiodically, on a scheduled basis, etc.) the timer value initiated by the extractor 412 to determine if the timer value has expired. Upon expiration of the timer value, the example installer 414 executes the adaptation for the respective operating device 318. In this manner, the installer 414 waits for the timer value to expire to execute the adaptation. In a CPS (e.g., the cyber physical system (CPS) 300 of FIG. 3), the respective times may be calculated and/or generated for respective operating devices (e.g., the first operational device 312, the second operational device 314, the third operational device 316, and the fourth operational device 318 of the first manufacturing cell 304, the first operational device 320, the second operational device 322, the third operational device 324, and the fourth operational device 326 of the second manufacturing cell 306, and/or the first operational device 328, the second operational device 330, the third operational device 332, and the fourth operational device 334 of the third manufacturing cell 308) such that when the timer values expire, each respective operating device executes an adaptation in a coordinated manner.

The example success determiner 416 of FIG. 4 communicates with the installer 414 to obtain an indication of the completed adaptation execution. The example success determiner is in communication with a pre-adaptation model 418 and a post-adaptation model 420 to evaluate pre-adaptation operating aspects and/or operating parameters with post-adaptation aspects and/or parameters to determine if the adaptation 313 was successful. For example, the success determiner 416 determines improvements in a plurality of aspects such as the execution time improvement (e.g., improvement in execution time of the operating device 318, a reduction of an execution duration for a task by a threshold amount), decision accuracy (e.g., accuracy of decisions made by the operating device 318), energy usage of the operating device 318 (e.g., reduction of energy used by a particular operating device by a threshold amount), resource usage of the operating device, and/or performance deviation of the operating device 318, service and/or platform errors of the operating device 318, communication efficiency of the operating device 318, etc.

The success determiner 416 determines the execution time improvement. In some examples, the execution time after the adaptation 313 execution is compared against the execution time before the adaptation 313 execution. In such examples, the relevant data may be stored in the post-adaptation model 420 and the pre-adaptation model 418, respectively. Alternatively, the execution time after the adaptation 313 execution may be compared against an adaptation benefit threshold, in which the adaptation benefit threshold is a function of the pre-adaptation model 418.

The success determiner 416 determines the decision accuracy. In some examples, the decision accuracy after the adaptation 313 execution is compared against the decision accuracy before the adaptation 313 execution. In such examples, the relevant data may be stored in the post-adaptation model 420 and the pre-adaptation model 418, respectively. Alternatively, the decision accuracy after the adaptation 313 execution may be compared against an adaptation benefit threshold, in which the adaptation benefit threshold is a function of the pre-adaptation model 418.

The success determiner 416 determines the energy usage improvement. In some examples, the energy usage after the adaptation 313 execution is compared against the energy usage before the adaptation 313 execution. In such examples, the relevant data may be stored in the post-adaptation model 420 and the pre-adaptation model 418, respectively. Alternatively, the energy usage after the adaptation 313 execution may be compared against an adaptation benefit threshold, in which the adaptation benefit threshold is a function of the pre-adaptation model 418.

The success determiner 416 determines the resource usage improvement. In some examples, the resource usage after the adaptation 313 execution is compared against the resource usage before the adaptation 313 execution. In such examples, the relevant data may be stored in the post-adaptation model 420 and the pre-adaptation model 418, respectively. Alternatively, the resource usage after the adaptation 313 execution may be compared against an adaptation benefit threshold, in which the adaptation benefit threshold is a function of the pre-adaptation model 418.

The success determiner 416 determines the improvement in service and/or platform errors. In some examples, the number of service and/or platform errors after the adaptation 313 execution is compared against the number of service and/or platform errors before the adaptation 313 execution. In such examples, the relevant data may be stored in the post-adaptation model 420 and the pre-adaptation model 418, respectively. Alternatively, the number of service and/or platform errors after the adaptation 313 execution may be compared against an adaptation benefit threshold, in which the adaptation benefit threshold is a function of the pre-adaptation model 418.

The success determiner 416 determines the communication efficiency improvement. In some examples, the communication efficiency after the adaptation 313 execution is compared against the communication efficiency before the adaptation 313 execution. In such examples, the relevant data may be stored in the post-adaptation model 420 and the pre-adaptation model 418, respectively. Alternatively, the communication efficiency after the adaptation 313 execution may be compared against an adaptation benefit threshold, in which the adaptation benefit threshold is a function of the pre-adaptation model 418.

Additionally, the success determiner 416 determines and the performance deviation. In some examples, the performance deviation after the adaptation 313 execution is compared against the performance deviation before the adaptation 313 execution. In such examples, the relevant data may be stored in the post-adaptation model 420 and the pre-adaptation model 418, respectively. Alternatively, the performance deviation after the adaptation 313 execution may be compared against an adaptation benefit threshold, in which the adaptation benefit threshold is a function of the pre-adaptation model 418.

Examples disclosed herein are not limited to the above-mentioned aspects and/or improvement determinations and, in fact, may include numerous other aspects to be used in determining the benefit of the adaptation 313. Additionally, in some examples, the success determiner 416 sends a response (e.g., an indication) to the originating node indication of whether the adaptation 313 led to an improvement (e.g., a benefit).

The example pre-adaptation model 418 is a current model representative of one or more aspects of the operating device 318. The pre-adaption model 418 includes pre-adaptation aspects for use in comparison by the success determiner 416. The example post-adaption model 420 is a live model representative of various aspects of the operating device 318. The post-adaption model 420 includes post-adaptation aspects for use in comparison by the success determiner 416. Examples disclosed herein may include any number of models to be utilized by the success determiner 416.

Figure 5:
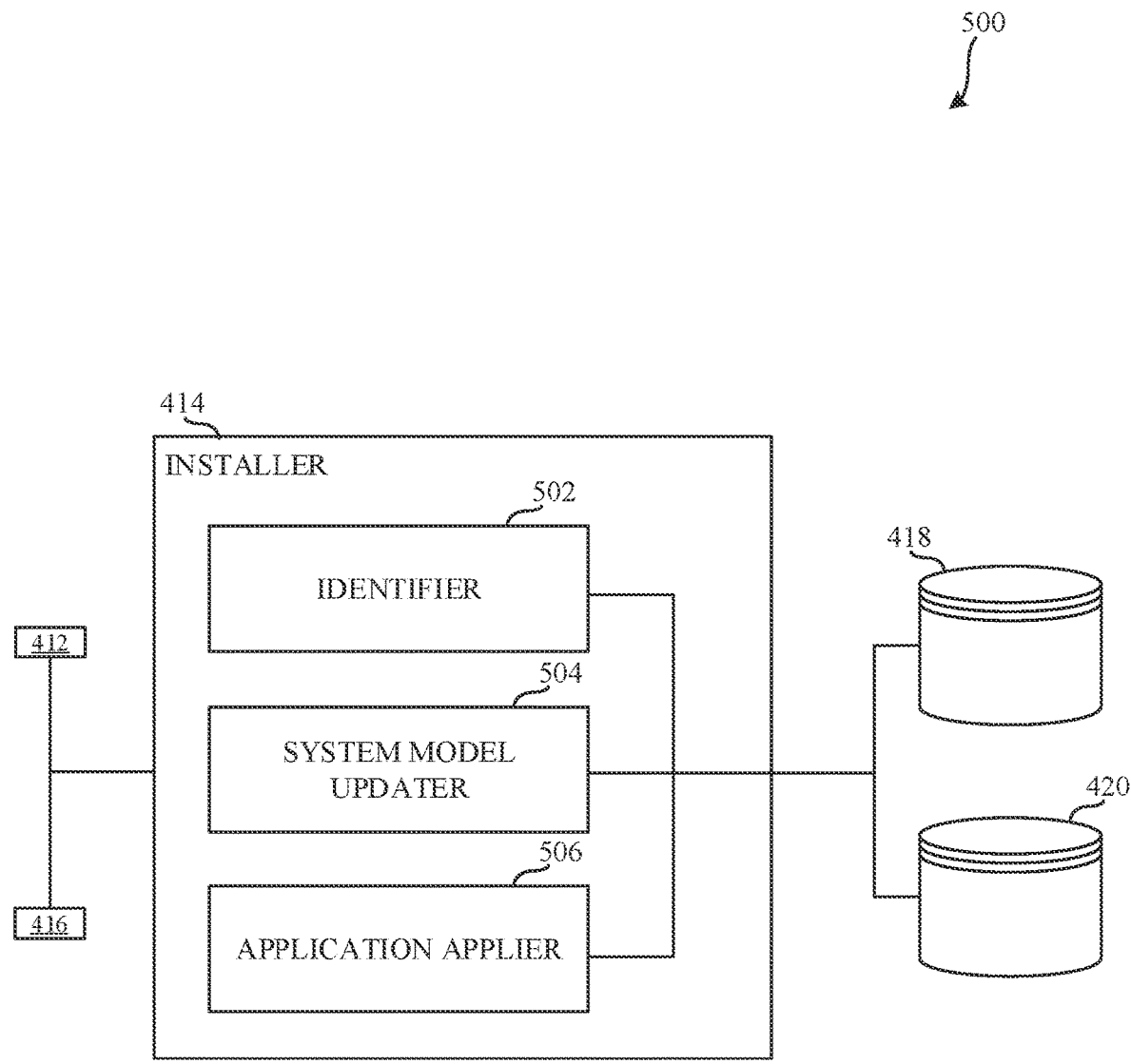
FIG. 5 is a block diagram illustrating an example installer to execute the adaptation of FIG. 3.

FIG. 5 is a block diagram 500 illustrating additional detail of the example installer 414 of FIG. 4 to execute the adaptation 313 of FIG. 3. The installer 414 includes an example identifier 502, an example system model updater 504, and an example application applier 506. The installer 414 is in communication with the example pre-adaptation model 418, the example post-adaptation model 420, the extractor 412, and the success determiner 416 of FIG. 4. In the illustrated example of FIG. 5, the example system model updater 504 is a means for updating, a means for model updating, an updating means, or a model updating means.

In operation, the example identifier 502 extracts the adaption 313 from the adaptation message 311. Additionally, the example identifier 502 identifies whether the adaptation 313 is to be applied as a system adaptation or a subsystem adaptation. For example, a system adaptation includes an adaptation that alters the performance of the operating device 318 (e.g., modifies the operating system). Alternatively, an example subsystem adaptation includes an adaptation that alters the performance of an aspect of the operating device 318 (e.g., modifies the throughput, modifies the resource usage, etc.) without affecting the operating device 318 operating system. In some examples the adaptation 313 may refer to the central processing unit (CPU), the cache, or the network interface controller (NIC). Alternatively, the adaptation 313 may apply to a subsystem or a more general system (e.g., a service running on the H-node (e.g., any of the H-nodes 310a, 310b, 310c, 310d, 310e, 310f, 310g, 310h, 310i, 310j, 310k, and/or 310l of FIG. 3), a hardware change in the subsystem, or an operating schedule change.

The example system model updater 504 obtains the live model (e.g., the post-adaptation model 420) for use in applying the adaptation 313. In some examples, the system model updater 504 replaces and/or updates existing content in the pre-adaptation model 518 with post-adaptation content in the post-adaptation model 520. For example, if the execution time before the adaptation was 2 seconds, and after the adaptation the execution time becomes 1.8 seconds, the system model updater 504 includes the 1.8 second timing in the post-adaptation model 520. In response, the adaptation applier 506 applies, executes, and/or installs the adaptation 313 to the live model (e.g., the post-adaptation model 420). In other examples disclosed herein, the adaptation applier 506 may apply the adaptation 313 to the pre-adaptation model 418 (e.g., the current model). The installer 414 communicates the completion of the adaptation 313 application, installation, and/or execution to the success determiner 416.

While an example manner of implementing the adaptation engine 402 of FIG. 4 is illustrated in FIGS. 3-5, one or more of the elements, processes and/or devices illustrated in FIGS. 3-5 may be combined, divided, re-arranged, omitted, eliminated and/or implemented in any other way. Further, the example adaptation retriever 404, the example adaptation support determiner 406, the example adaptation executor 410, the example extractor 412, the example installer 414, the example success determiner 416, the example identifier 502, the example system model updater 504, the example application applier 506 and/or, more generally, the example adaptation engine 402 of FIG. 4 may be implemented by hardware, software, firmware and/or any combination of hardware, software and/or firmware. Thus, for example, any of the example adaptation retriever 404, the example adaptation support determiner 406, the example adaptation executor 410, the example extractor 412, the example installer 414, the example success determiner 416, the example identifier 502, the example system model updater 504, the example application applier 506 and/or, more generally, the example adaptation engine 402 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example adaptation retriever 404, the example adaptation support determiner 406, the example adaptation executor 410, the example extractor 412, the example installer 414, the example success determiner 416, the example identifier 502, the example system model updater 504, and/or the example application applier 506 is/are hereby expressly defined to include a non-transitory computer readable storage device or storage disk such as a memory, a digital versatile disk (DVD), a compact disk (CD), a Blu-ray disk, etc. including the software and/or firmware. Further still, the example adaptation engine 402 of FIG. 4 may include one or more elements, processes and/or devices in addition to, or instead of, those illustrated in FIGS. 3-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
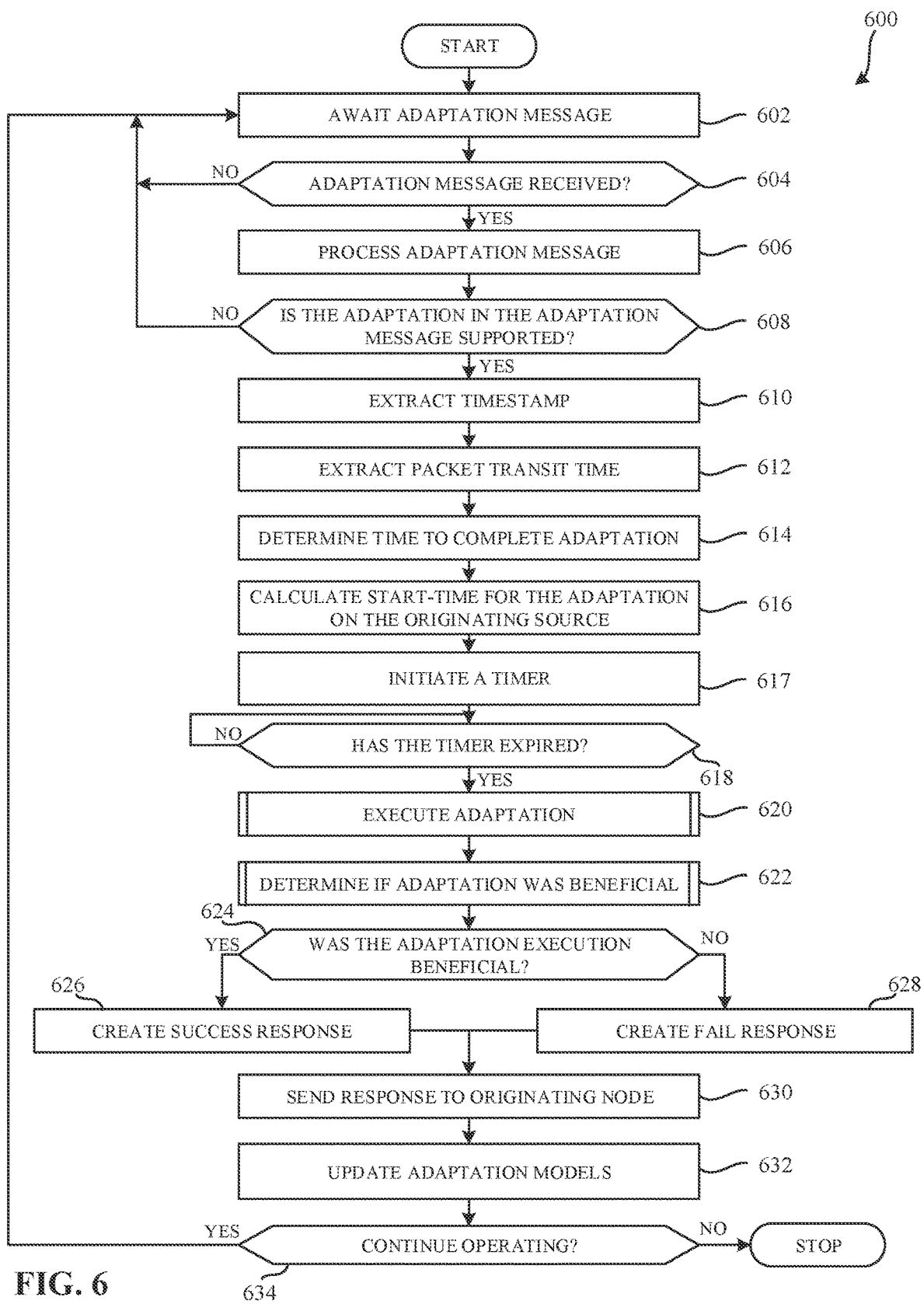
FIG. 6 is a flowchart representative of machine readable instructions which may be executed to implement the adaptation engine of FIG. 4 to install the adaptation for the respective operating device.
Figure 7:
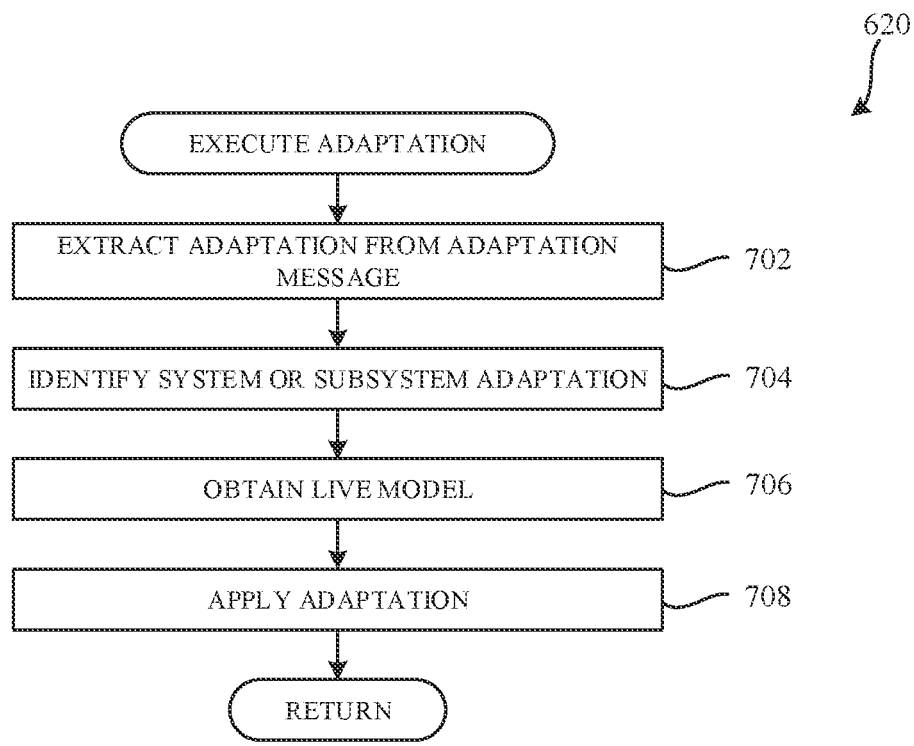
FIG. 7 is a flowchart representative of machine readable instructions which may be executed to implement the installer of FIGS. 4 and 5 to install the adaptation for the respective operating device.
Figure 8:
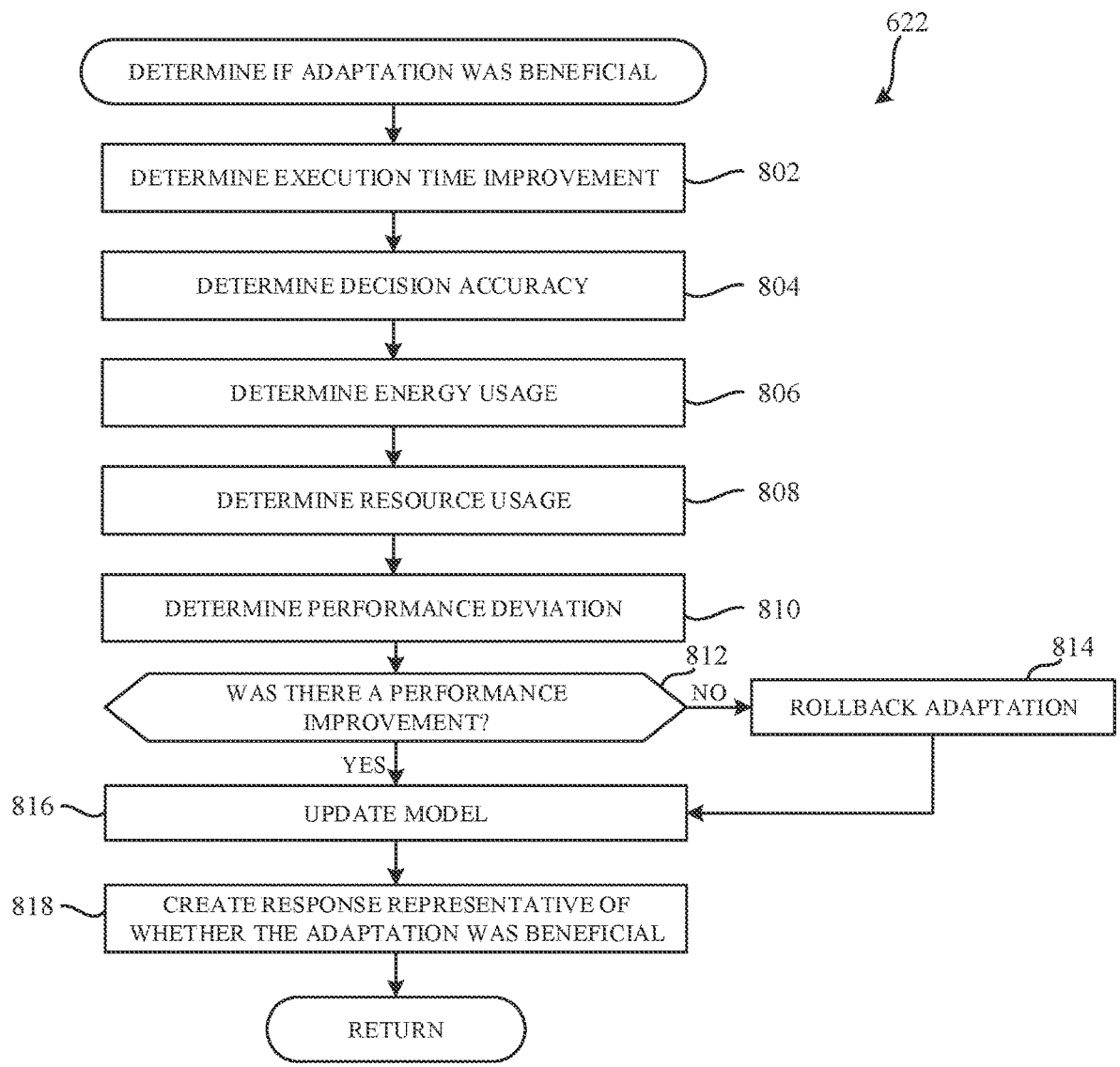
FIG. 8 is a flowchart representative of machine readable instructions which may be executed to implement the success determiner of FIG. 4 to determine if the adaptation is beneficial.

Flowcharts representative of example hardware logic, machine readable instructions, hardware implemented state machines, and/or any combination thereof for implementing the adaptation engine 402 of FIG. 4 is shown in FIGS. 6-8. The machine readable instructions may be one or more executable programs or portion(s) of an executable program for execution by a computer processor such as the processor 912 shown in the example processor platform 900 discussed below in connection with FIGS. 6-8. The program(s) may be embodied in software stored on a non-transitory computer readable storage medium such as a CD-ROM, a floppy disk, a hard drive, a DVD, a Blu-ray disk, or a memory associated with the processor 912, but the entire program(s) and/or parts thereof could alternatively be executed by a device other than the processor 912 and/or embodied in firmware or dedicated hardware. Further, although the example program(s) are described with reference to the flowcharts illustrated in FIGS. 6-8, many other methods of implementing the example adaptation engine 402 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 6 is a flowchart 600 representative of machine readable instructions which may be executed to implement an adaptation engine (e.g., the adaptation engine 402 of FIG. 4) to install an adaptation (e.g., the adaptation 313) for a respective operating device (e.g., the operating device 318). The example adaptation retriever 404 waits for the adaptation message 311 from the originating location (e.g., the central cloud 302 or another H-node (e.g., any of the H-nodes 310a, 310b, 310c, 310d, 310e, 310f, 310g, 310h, 310i, 310j, 310k, and/or 310l of FIG. 3)) (block 602). Additionally, the adaptation retriever 404 checks if the adaptation message 311 is received by the H-node (e.g., any of the H-nodes 310a, 310b, 310c, 310d, 310e, 310f, 310g, 310h, 310i, 310j, 310k, and/or 310l of FIG. 3) (block 604). If the adaptation retriever 404 receives the adaptation message 311, then the adaptation retriever 404 processes the adaptation message 311 (block 606). If the adaptation retriever 404 does not receive the adaptation message 311, then the adaptation retriever 404 continues to wait for the adaptation message 311 (block 602).

The adaptation support determiner 406 communicates with the adaptation database 408 to determine if the adaptation 313 in the adaptation message 311 is compatible with and/or supported by the operating device 318 (block 608). The extractor 412 extracts the timestamp of the adaptation message 311 if the adaptation support determiner 406 determines the adaptation 313 is compatible with and/or supported by the operating device 318. (block 610). Alternatively, the adaptation retriever 404 continues to wait for an adaptation message 311 if the adaptation support determiner 406 determines the adaptation 313 is not compatible with and/or supported by the operating device (block 602).

Additionally, the extractor 412 extracts the packet transit time (e.g., the transit time of the adaptation message 311) (block 612). Furthermore, the extractor 412 communicates with the local adaptation timing database 413 to determine the time to complete the adaptation 313 (e.g., the time to execute and/or install the adaptation 313) (block 614). In response to extracting the timestamp, the packet transit time, and determining the time to complete the adaptation 313 (e.g., the time to execute and/or install the adaptation 313), the extractor further calculates the start-time for the adaptation 313 on the originating node (e.g., the central cloud 302 and/or another H-node (e.g., any of the H-nodes 310a, 310b, 310c, 310d, 310e, 310f, 310g, 310h, 310i, 310j, 310k, and/or 310l of FIG. 3)) (block 616). Furthermore, the extractor 412 initiates a timer value in response to calculating the start-time for the adaptation 313 (block 617).

An example start-time calculation includes determining a change in time between the originating node (e.g., the central cloud 302 and/or another H-node (e.g., any of the H-nodes 310a, 310b, 310c, 310d, 310e, 310f, 310g, 310h, 310i, 310j, 310k, and/or 310l of FIG. 3)) clock and the receiving node clock. In such examples, the determination of the change in time could be ignored if the CPS is using a time coordination protocol (e.g., Precision Time Protocol (PTP)) in order to maintain a common clock on all nodes in the system. Furthermore, the start-time for the adaptation 313 on the originating node (e.g., the central cloud 302 and/or another H-node (e.g., any of the H-nodes 310a, 310b, 310c, 310d, 310e, 310f, 310g, 310h, 310i, 310j, 310k, and/or 310l of FIG. 3)) can be calculated as the following:

$$\text{Start-time} = \Delta t_1 + 2 \ast t_2 + t_3 + t_4 + t_5 + c \quad \text{Equation 1}$$

In Equation 1, $\Delta t_1$ is the difference in time between the originating node and the receiving node, $t_2$ is the transit time, $t_3$ is the receiving node's time, $t_4$ is the request processing time (e.g., the time obtained from the local adaptation timing database 413), $t_5$ is the processing time of the originating node (e.g., the central cloud 302 and/or another H-node (e.g., any of the H-nodes 310a, 310b, 310c, 310d, 310e, 310f, 310g, 310h, 310i, 310j, 310k, and/or 310l of FIG. 3)) obtained from packet metadata, and the variable c represents an adjustment time (e.g., a buffer guardband).

In the example illustrated in Equation 1, the variables $t_1$, $t_2$, $t_3$, $t_4$, $t_5$, and c may be encapsulated in the coordination message together with calculated start-time to be sent to the originating node (e.g., the central cloud 302 and/or another H-node (e.g., any of the H-nodes 310a, 310b, 310c, 310d, 310e, 310f, 310g, 310h, 310i, 310j, 310k, and/or 310l of FIG. 3)).

In an alternate example, the start-time for the adaptation 313 on the originating node (e.g., the central cloud 302 and/or another H-node (e.g., any of the H-nodes 310a, 310b, 310c, 310d, 310e, 310f, 310g, 310h, 310i, 310j, 310k, and/or 310l of FIG. 3)) can be calculated as the following:

$$\text{Start-time} = \Delta t_1 + 2 \ast t_2 + t_3 + (t_4 - t_5) + c \quad \text{Equation 2}$$

In Equation 2, $\Delta t_1$ is the difference in time between the originating node and the receiving node, $t_2$ is the transit time, $t_3$ is the receiving node's time, $t_4$ is the request processing time (e.g., the time obtained from the local adaptation timing database 413), $t_5$ is the processing time of the originating node (e.g., the central cloud 302 and/or another H-node (e.g., any of the H-nodes 310a, 310b, 310c, 310d, 310e, 310f, 310g, 310h, 310i, 310j, 310k, and/or 310l of FIG. 3)) obtained from packet metadata, and the variable c represents an adjustment time (e.g., a buffer guardband).

In the example illustrated in Equation 2, the variables $t_1$, $t_2$, $t_3$, $t_4$, $t_5$, and c may be encapsulated in the coordination message together with calculated start-time to be sent to the originating node (e.g., the central cloud 302 and/or another H-node (e.g., any of the H-nodes 310a, 310b, 310c, 310d, 310e, 310f, 310g, 310h, 310i, 310j, 310k, and/or 310l of FIG. 3)). In the example illustrated in Equation 2, if the processing time of the originating node ($t_5$) is equivalent to the receiving node's time ($t_4$), then the difference between $t_4$ and $t_5$ is zero. Alternatively, if the originating node can perform the adaptation quicker than the receiving node (e.g., 25 seconds to complete at the originating node and 30 seconds to complete at the receiving node), then the difference between $t_4$ and $t_5$ is properly accounted for. Likewise, if the originating node can perform the adaptation slower than the receiving node (e.g., 30 seconds to complete the adaptation at the originating node and 25 seconds to complete the adaptation at the receiving node), then the difference between $t_4$ and $t_5$ is accounted for.

Furthermore, when the coordination message is sent, a countdown time (e.g., a timer value) is set to count down to the execution of the adaptation 113. When the coordination message is received at the originating node (e.g., the central cloud 302 and/or another H-node (e.g., any of the H-nodes 310a, 310b, 310c, 310d, 310e, 310f, 310g, 310h, 310i, 310j, 310k, and/or 310l of FIG. 3)), the originating node (e.g., the central cloud 302 and/or another H-node (e.g., any of the H-nodes 310a, 310b, 310c, 310d, 310e, 310f, 310g, 310h, 310i, 310j, 310k, and/or 310l of FIG. 3)) extracts the start-time. Alternatively, the originating node (e.g., the central cloud 302 and/or another H-node (e.g., any of the H-nodes 310a, 310b, 310c, 310d, 310e, 310f, 310g, 310h, 310i, 310j, 310k, and/or 310l of FIG. 3)) may modify the start-time accordingly if there is a difference between the adaptation completion time (e.g., $t_4$) for the two nodes (e.g., start earlier if the adaptation takes longer on the originator source or start later if it takes a short amount of time). The constant variable (c) provides an adjustable time window that accounts for various accommodations (e.g., delayed response). In some examples, the start-time may be determined as a function of the transit time, the duration, the timestamp, and/or any other suitable time or variable.

The installer 414 checks to see if the timer value created by the extractor 412 has expired (block 618). If the timer value created by the extractor 412 has not expired, then the installer continues to check if the timer value created by the extractor 412 has expired (block 618). Otherwise, if the installer 414 determines that the timer value created by the extractor 412 has expired, then the installer 414 begins to execute the adaptation 313 (block 620).

In response to executing the adaptation 313, the success determiner 416 determines if the adaption 313 was beneficial (block 622) and checks to see if the adaption 313 was beneficial (block 624). If the adaption 313 is a beneficial adaptation 313, the then success determiner 416 creates a success response (block 626). Alternatively, if the adaption 313 is not a beneficial adaptation 313, then the success determiner 416 creates a fail response (block 628).

The success determiner 416 sends the response (e.g., the success response or the fail response) to the originating node (e.g., the node that sent the adaptation message 311) (block 630). Additionally, the success determiner 416 updates the adaptation models (block 632). In other examples disclosed herein, the adaptation engine 402 may update the adaptation model, block 632. Alternatively, the response may be used by the originating node (e.g., the node that sent the adaptation message 311) to determine if the adaptation 313 is beneficial or not, and if the adaptation 313 is not beneficial, the originating node (e.g., the node that sent the adaptation message 311) can reject it.

The adaptation engine 402 determines whether to continue operating (block 634). Examples in which the adaptation engine 402 determines to cease operation include loss of power, damaged device, etc. In alternate examples, the adaptation engine 402 determines to continue operating, in which the adaptation retriever 404 continues to wait for an adaptation message 311 (block 602).

FIG. 7 is a flowchart representative of machine readable instructions which may be executed to implement the installer 414 of FIG. 4 to install the adaptation 313 for the respective operating device 318. In examples disclosed herein, the installer 414 extracts the adaptation 313 from the adaptation message 311 (block 702). In other examples disclosed herein, the extractor 412 may extract the adaptation 313 from the adaptation message 311 (block 702).

The installer 414 identifies the system or subsystem which the adaptation 313 is to be executed for (block 704). In examples disclosed herein, the installer 414 identifies the proper location and/or system to install the adaptation 313. Additionally, the installer 414 communicates with the post-adaptation model 420 to obtain a live model of the current system and/or subsystem (block 706). In response to obtaining the post-adaptation model 420, the installer 414 applies the adaptation 313 to the post-adaptation model 420 (block 708). In examples disclosed herein, the installer 414 may apply the adaptation 313 to the pre-adaptation model 418, or any other current system and/or subsystem model (e.g., any of the pre-adaptation model 418 and/or the post-adaptation model 420). After applying the adaptation 313, the installer 414 returns control to the success determiner 416.

FIG. 8 is a flowchart representative of machine readable instructions which may be executed to implement the success determiner 416 of FIG. 4 to determine if the adaptation 313 is beneficial. The success determiner 416 determines the execution time improvement (block 802). In some examples, the execution time after the adaptation 313 execution is compared against the execution time before the adaptation 313 execution. In such examples, the relevant data may be stored in the post-adaptation model 420 and the pre-adaptation model 418, respectively. Alternatively, the execution time after the adaptation 313 execution may be compared against an adaptation beneficial threshold, in which the adaptation beneficial threshold is a function of the pre-adaptation model 418.

The success determiner 416 determines the decision accuracy (block 804). In some examples, the decision accuracy after the adaptation 313 execution is compared against the decision accuracy before the adaptation 313 execution. In such examples, the relevant data may be stored in the post-adaptation model 420 and the pre-adaptation model 418, respectively. Alternatively, the decision accuracy after the adaptation 313 execution may be compared against an adaptation beneficial threshold, in which the adaptation beneficial threshold is a function of the pre-adaptation model 418.

The success determiner 416 determines the energy usage improvement (block 806). In some examples, the energy usage after the adaptation 313 execution is compared against the energy usage before the adaptation 313 execution. In such examples, the relevant data may be stored in the post-adaptation model 420 and the pre-adaptation model 418, respectively. Alternatively, the energy usage after the adaptation 313 execution may be compared against an adaptation beneficial threshold, in which the adaptation beneficial threshold is a function of the pre-adaptation model 418.

The success determiner 416 determines the resource usage improvement (block 808). In some examples, the resource usage after the adaptation 313 execution is compared against the resource usage before the adaptation 313 execution. In such examples, the relevant data may be stored in the post-adaptation model 420 and the pre-adaptation model 418, respectively. Alternatively, the resource usage after the adaptation 313 execution may be compared against an adaptation beneficial threshold, in which the adaptation beneficial threshold is a function of the pre-adaptation model 418.

Additionally, the success determiner 416 determines the performance deviation (block 810). In some examples, the performance deviation after the adaptation 313 execution is compared against the performance deviation before the adaptation 313 execution. In such examples, the relevant data may be stored in the post-adaptation model 420 and the pre-adaptation model 418, respectively. Alternatively, the performance deviation after the adaptation 313 execution may be compared against an adaptation beneficial threshold, in which the adaptation beneficial threshold is a function of the pre-adaptation model 418.

In other examples disclosed herein, the success determiner 416 may perform any of the controls illustrated in blocks 802-810, some of the controls illustrated in blocks 802-810, or any suitable control (e.g., determine the improvement in service and/or platform errors, communication efficiency, etc.).

In order to execute the control of blocks 802-810, the success determiner 416 communicates with the pre-adaptation model 418 and the post-adaptation model 420. In examples disclosed herein, the pre-adaptation model 418 includes pre-adaptation information (e.g., pre-adaptation execution time, pre-adaptation decision accuracy, pre-adaptation energy usage, pre-adaptation resource usage, pre-adaptation performance deviation, pre-adaptation service and/or platform errors, pre-adaptation communication efficiency). Likewise, in examples disclosed herein, the success determiner 416 interacts with the post-adaptation model 420 (e.g., a live model) to update post-adaptation information (e.g., post-adaptation execution time, post-adaptation decision accuracy, post-adaptation energy usage, post-adaptation resource usage, post-adaptation performance deviation, post-adaptation service and/or platform errors, post-adaptation communication efficiency).

The success determiner 416 determines if there was a performance improvement (block 812). In examples disclosed herein, the success determiner 416 compares the pre-adaptation information (e.g., the pre-adaptation model 418) with the post-adaptation information (e.g., the post-adaptation model 420) to determine whether there was performance improvement (e.g., whether the adaptation 313 is beneficial) (block 812). If the success determiner 416 determines there was not a performance improvement, the success determiner 416 rolls back the adaptation 313 (block 814). In examples disclosed herein, the success determiner 416 may revert the system and/or subsystem of the operating device 318 to a state before the adaptation 313 (e.g., utilize the pre-adaptation model 418).

If the success determiner 416 determines there was a performance improvement, the success determiner 416 updates the post-adaptation model 420 (block 816). For example, the success determiner 416 may update the post-adaptation model 420 to include post-adaptation information (e.g., post-adaptation execution time, post-adaptation decision accuracy, post-adaptation energy usage, post-adaptation resource usage, post-adaptation performance deviation, post-adaptation service and/or platform errors, post-adaptation communication efficiency). In other examples disclosed herein, the success determiner 416 may notify surrounding H-nodes (e.g., any of the H-nodes 310*a*, 310*b*, 310*c*, 310*d*, 310*e*, 310*f*, 310*g*, 310*h*, 310*i*, 310*j*, 310*k*, and/or 310*l* of FIG. 3) of the beneficial adaptation 313.

Additionally, the success determiner 416 creates a response representative of whether the adaptation 313 was beneficial (block 818). The response created by the success determiner is indicative of a success or failure of the adaptation 313. In response, the control returns to block 624 of FIG. 6.

Figure 9:
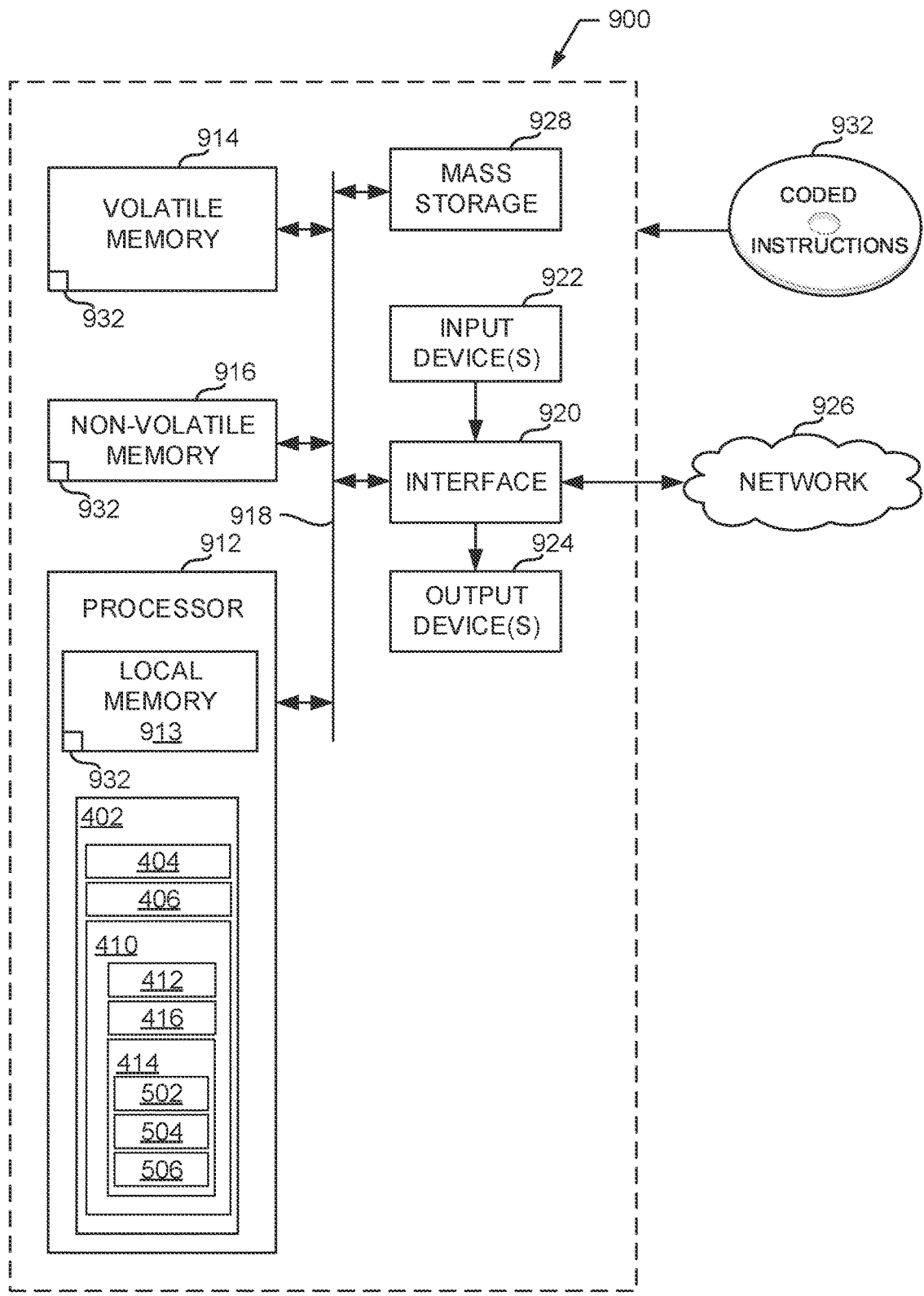
FIG. 9 is a block diagram of an example processing platform structured to execute the instructions of FIGS. 6-8 to implement the adaptation engine.

FIG. 9 is a block diagram of an example processing platform structured to execute the instructions of FIGS. 6-8 to implement the adaptation engine 402. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example adaptation retriever 404, the example adaptation support determiner 406, the example adaptation executor 410, the example extractor 412, the example installer 414, the example success determiner 416, the example identifier 502, the example system model updater 504, and the example application applier 506.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAIVIBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 6-8 may be stored in the mass storage device 928, in the volatile memory 914, in the non-volatile memory 916, and/or on a removable non-transitory computer readable storage medium such as a CD or DVD.

In other examples, the operations and functionality described above with reference to FIGS. 3 to 9 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 10:
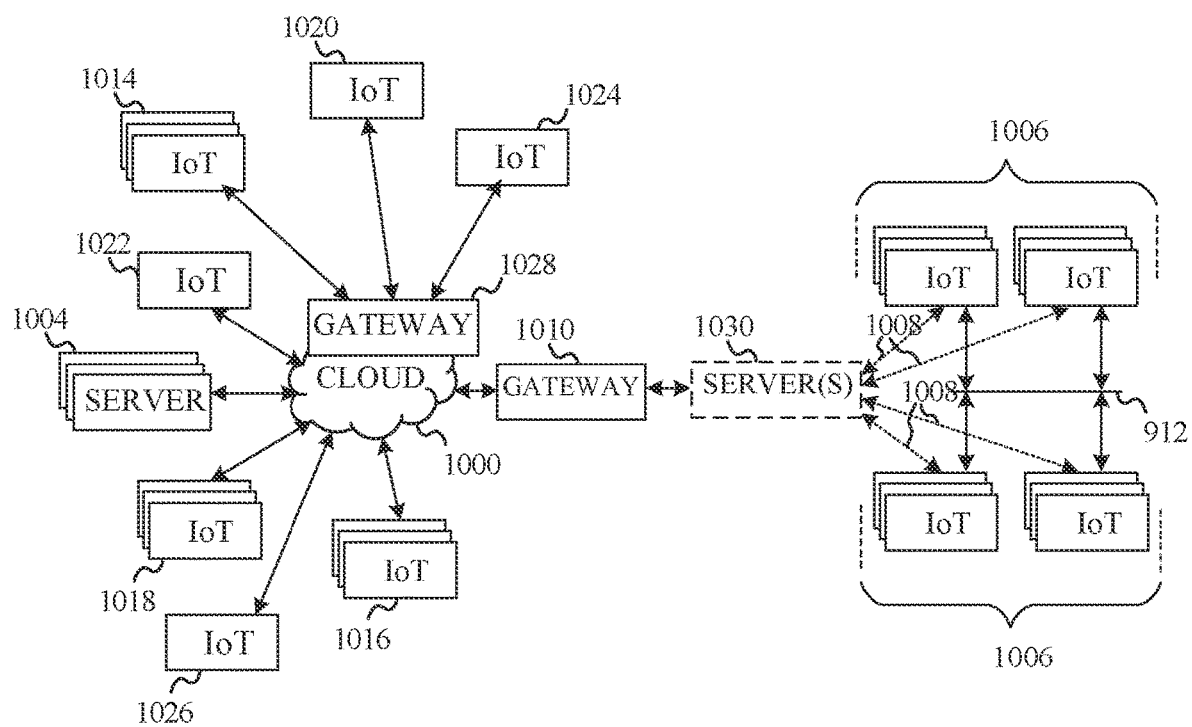
FIG. 10 illustrates a block diagram of a network illustrating communications among a number of IoT devices, according to an example.

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1110 or 1128 to communicate with remote locations such as the cloud 1100; the IoT devices may also use one or more servers 1130 to facilitate communication with the cloud 1100 or with the gateway 1110. For example, the one or more servers 1130 may operate as an intermediate network node to support a local edge cloud or fog implementation among a local area network. Further, the gateway 1128 that is depicted may operate in a cloud-to-gateway-to-many edge devices configuration, such as with the various IoT devices 1114, 1120, 1124 being constrained or dynamic to an assignment and use of resources in the cloud 1100.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 2), or a combination therein. The groups of IoT devices may be deployed in various residential, commercial, and industrial settings (including in both private or public environments).

As can be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 2).

Figure 11:
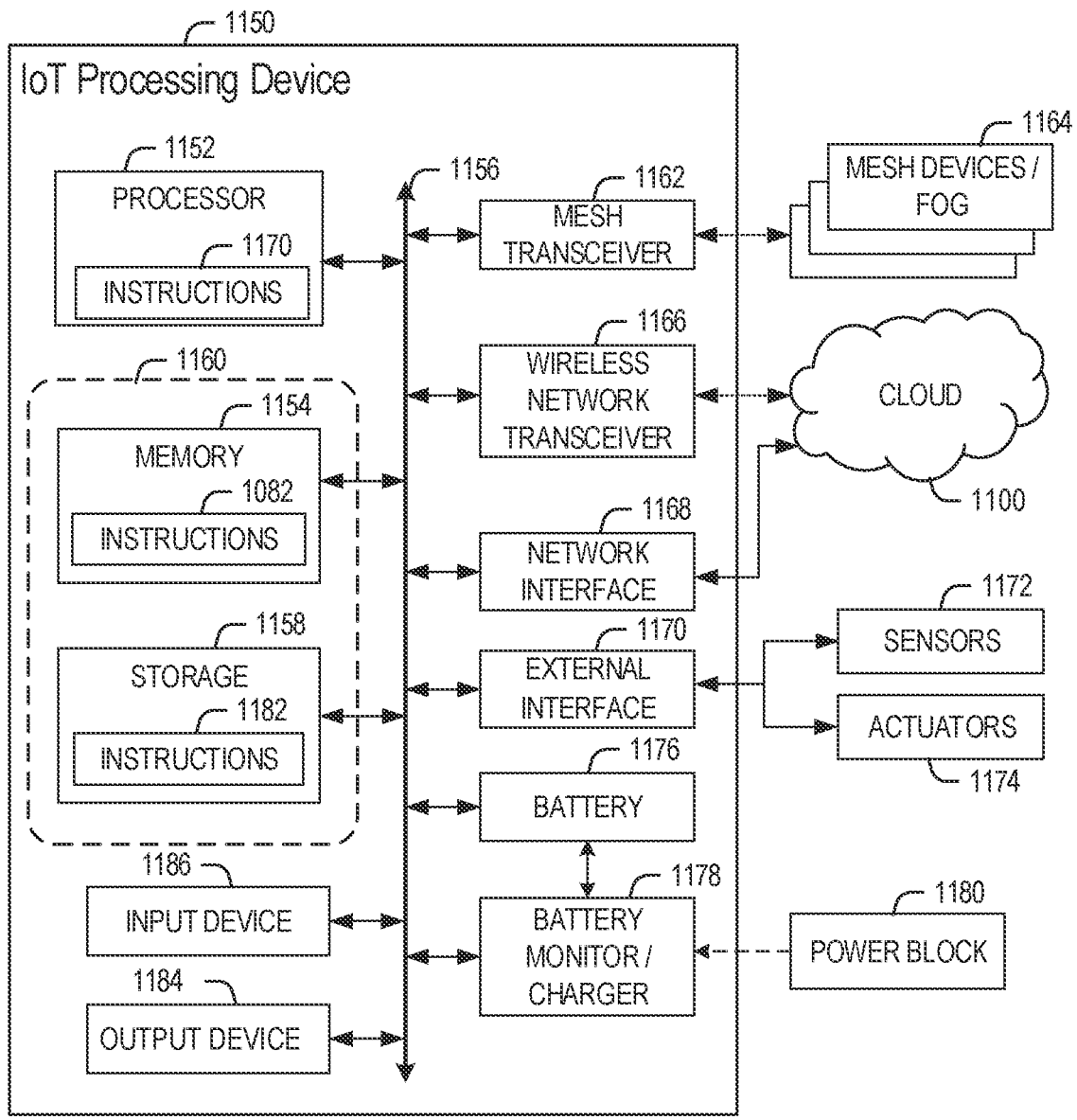
FIG. 11 illustrates a block diagram for an example IoT processing system architecture upon which any one or more of the techniques (e.g., operations, processes, methods, and methodologies) discussed herein may be performed, according to an example.

FIG. 11 is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. 11 is intended to depict a high-level view of components of the IoT device 1150. However, some of the components shown may be omitted, additional components may be present, and different arrangement of the components shown may occur in other implementations.

The IoT device 1150 may include a processor 1152, which may be a microprocessor, a multi-core processor, a multi-threaded processor, an ultra-low voltage processor, an embedded processor, or other known processing element. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel®

Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in a SoC based system. Other bus systems may be included, such as an I2C interface, an SPI interface, point to point interfaces, and a power bus, among others.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 10 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others.

The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to allow connect to a second network, for example, a NIC 1168 providing communications to the cloud over Ethernet, and a second NIC 1168 providing communications to other devices over another type of network.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (I/O) devices may be present within, or connected to, the IoT device 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Ariz. or an IC from the UCD90xxx family from Texas Instruments of Dallas, Tex. The battery monitor/charger 1178 may communicate the information on the battery 1176 to the processor 1152 over the interconnect 1156. The battery monitor/charger 1178 may also include an analog-to-digital (ADC) convertor that allows the processor 1152 to directly monitor the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, Calif., among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1054, the storage 1158, or the processor 1152 may be embodied as a non-transitory, machine readable medium 1160 including code to direct the processor 1152 to perform electronic operations in the IoT device 1150. The processor 1152 may access the non-transitory, machine readable medium 1160 over the interconnect 1156. For instance, the non-transitory, machine readable medium 1160 may be embodied by devices described for the storage 1158 of FIG. 11 or may include specific storage units such as optical disks, flash drives, or any number of other hardware devices. The non-transitory, machine readable medium 1160 may include instructions to direct the processor 1152 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit including custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, include one or more physical or logical blocks of computer instructions, which may, for instance, be organized as an object, procedure, or function. Nevertheless, the executables of an identified component or module need not be physically located together, but may include disparate instructions stored in different locations which, when joined logically together, include the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus to reduce disruptions in a cyber physical system (CPS), the apparatus including an adaptation support determiner to determine if an adaptation in an adaptation message is supported by a first device, the adaptation message being sent by a second device, an extractor to, in response to the determination that the adaptation in the adaptation message is supported by the first device, calculate a start-time for the first device based on (a) a transit duration of the adaptation message, (b) an execution duration of the adaptation in the adaptation message, and (c) a timestamp of when the second device sent the adaptation message, and initiate a timer value for the first device and the second device, the timer value being a function of the start-time. The apparatus further including an installer to, in response to the timer value satisfying a threshold, execute the adaptation to reduce disruptions in the CPS.

In Example 2, the subject matter of Example 1 can optionally include that the extractor is to send the timer value to the second device to coordinate execution of the adaptation between the first device and the second device.

In Example 3, the subject matter of any one or more of Examples 1-2 can optionally include that the threshold is satisfied when the timer value expires.

In Example 4, the subject matter of any one or more of Examples 1-3 can optionally include a success determiner to, in response to determining the adaptation improves at least one of energy usage, resource usage, or execution time by at least an adaptation benefit threshold, notify surrounding devices to execute the adaptation.

In Example 5, the subject matter of any one or more of Examples 1-4 can optionally include a system model updater to update a first model to include data representing at least one of energy usage, resource usage, or execution time.

In Example 6, the subject matter of any one or more of Examples 1-5 can optionally include that the adaptation support determiner is to notify surrounding devices to not execute the adaptation until a success determiner has determined the adaptation improves an operating parameter.

In Example 7, the subject matter of any one or more of Examples 1-6 can optionally include that the operating parameter includes at least one of energy usage, resource usage, or execution time.

Example 8 is an apparatus for reducing disruptions in a cyber physical system (CPS), the apparatus including means for determining if an adaptation in an adaptation message is supported by a first device, the adaptation message being sent by a second device, in response to the determination that the adaptation in the adaptation message is supported by the first device, means for controlling a timer, the timer controlling means to calculate a start-time for the first device based on (a) a transit duration of the adaptation message, (b) an execution duration of the adaptation in the adaptation message, and (c) a timestamp of when the second device sent the adaptation message and initiate a timer value for the first device and the second device, the timer value being a function of the start-time. The example apparatus further including, in response to the timer value satisfying a threshold, means for installing, the installing means to execute the adaptation to reduce disruptions in the CPS.

In Example 9, the subject matter of Example 8 can optionally include that the timer controlling means is to send the timer value to the second device to coordinate execution of the adaptation between the first device and the second device.

In Example 10, the subject matter of any one or more of Examples 8-9 can optionally include that the threshold is satisfied when the timer value expires.

In Example 11, the subject matter of any one or more of Examples 8-10 can optionally include, in response to determining the adaptation improves at least one of energy usage, resource usage, or execution time by at least an adaptation benefit threshold, means for notifying to cause surrounding devices to execute the adaptation.

In Example 12, the subject matter of any one or more of Examples 8-11 can optionally include means for model updating to update a first model to include data representing at least one of energy usage, resource usage, or execution time.

In Example 13, the subject matter of any one or more of Examples 8-12 can optionally include means for notifying to prevent execution of the adaptation on surrounding devices until the adaptation is determined to improve an operating parameter.

In Example 14, the subject matter of any one or more of Examples 8-13 can optionally include that the operating parameter includes at least one of energy usage, resource usage, or execution time.

Example 15 is a non-transitory computer readable medium including computer readable instructions which, when executed, cause at least one processor to at least, determine if an adaptation in an adaptation message is supported by a first device, the adaptation message being sent by a second device, calculate a start-time for the first device based on (a) a transit duration of the adaptation message, (b) an execution duration of the adaptation in the adaptation message, and (c) a timestamp of when the second device sent the adaptation message, initiate a timer value for the first device and the second device, the timer value being a function of the start-time, and execute the adaptation to reduce disruptions in the CPS.

In Example 16, the subject matter of Example 15 can optionally include that the instructions, when executed, cause the at least one processor to send the timer value to the second device to coordinate execution of the adaptation between the first device and the second device.

In Example 17, the subject matter of any one or more of Examples 15-16 can optionally include that the threshold is satisfied when the timer value expires.

In Example 18, the subject matter of any one or more of Examples 15-17 can optionally include that the instructions, when executed, cause the at least one processor to, in response to determining the adaptation improves at least one of energy usage, resource usage, or execution time by at least an adaptation benefit threshold, notify surrounding devices to execute the adaptation.

In Example 19, the subject matter of any one or more of Examples 15-18 can optionally include that the instructions, when executed, cause the at least one processor to update a first model to include data representing at least one of energy usage, resource usage, or execution time.

In Example 20, the subject matter of any one or more of Examples 15-19 can optionally include that the instructions, when executed, cause the at least one processor to notify surrounding devices to not execute the adaptation until determining the adaptation improves an operating parameter.

In Example 21, the subject matter of any one or more of Examples 15-20 can optionally include that the operating parameter includes at least one of energy usage, resource usage, or execution time.

Example 22 is a computer implemented method to reduce disruptions in a cyber physical system (CPS), the method including determining, by executing an instruction with at least one processor, if an adaptation in an adaptation message is supported by a first device, the adaptation message being sent by a second device, calculating, by executing an instruction with at least one processor, a start-time for the first device based on (a) a transit duration of the adaptation message, (b) an execution duration of the adaptation in the adaptation message, and (c) a timestamp of when the second device sent the adaptation message, initiating, by executing an instruction with at least one processor, a timer value for the first device and the second device, the timer value being a function of the start-time, and executing, by executing an instruction with at least one processor, the adaptation to reduce disruptions in the CPS.

In Example 23, the subject matter of Example 22 can optionally include sending the timer value to the second device to coordinate execution of the adaptation between the first device and the second device.

In Example 24, the subject matter of any one or more of Examples 22-23 can optionally include that the threshold is satisfied when the timer value expires.

In Example 25, the subject matter of any one or more of Examples 22-24 can optionally include, in response to determining the adaptation improves at least one of energy usage, resource usage, or execution time by at least an adaptation benefit threshold, notifying surrounding devices to execute the adaptation.

In Example 26, the subject matter of any one or more of Examples 22-25 can optionally include updating a first model to include data representing at least one of energy usage, resource usage, or execution time.

In Example 27, the subject matter of any one or more of Examples 22-26 can optionally include notifying surrounding devices to not execute the adaptation until determining the adaptation improves an operating parameter.

In Example 28, the subject matter of any one or more of Examples 22-27 can optionally include that the operating parameter includes at least one of energy usage, resource usage, or execution time.

An example computer readable medium comprises first instructions that when executed cause a machine to at least one of distribute, configure, assemble, install, instantiate, retrieve, decompress, and decrypt second instructions for execution, the second instructions to, when executed, cause a machine to: determine if an adaptation in an adaptation message is supported by a first device, the adaptation message being sent by a second device, in response to the determination that the adaptation in the adaptation message is supported by the first device, calculate a start-time for the first device based on (a) a transit duration of the adaptation message, (b) an execution duration of the adaptation in the adaptation message, and (c) a timestamp of when the second device sent the adaptation message, and initiate a timer value for the first device and the second device, the timer value being a function of the start-time, and in response to the timer value satisfying a threshold, execute the adaptation to reduce disruptions in a cyber physical system (CPS).

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

From the foregoing, it will be appreciated that example methods, apparatus, systems and articles of manufacture have been disclosed that coordinate respective start-times for corresponding H-nodes applying adaptations. Disclosed methods, apparatus, systems and articles of manufacture improve the efficiency of using a computing device by extracting, from an adaptation message, the transit time of such adaptation message, the timestamp indicating the sending time of such adaptation message, and the time to apply such adaptation message to calculate a respective start-time for the originating node to apply such adaptation in the adaptation message. Absent calculating a respective start-time, disruptions may occur (e.g., improper manufacturing techniques, bottlenecks, inefficient process flow) that lead to different types of inefficiencies. Furthermore, the disclosed methods, apparatus and articles of manufacture improve the efficiency of using a computing device by reducing disruptions (e.g., improper manufacturing techniques, bottlenecks, inefficient process flow) created from uncoordinated adaptations by computing a respective start-time to coordinate the application of such adaptations. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to reduce disruptions in a system, the apparatus comprising:
   memory;
   machine readable instructions; and
   programmable circuitry to be programmed by the machine readable instructions to:
   initiate a timer value based on receipt of an adaptation message at a first device from a second device, the timer value being a function of a start-time calculated for the first device;
   compare the timer value to a threshold value;
   direct the first device to execute an adaptation identified in the adaptation message based on the timer value satisfying the threshold value; and
   when an operating parameter associated with the first device is associated with a disruption:
   send a notification to prevent further execution of the adaptation; and
   direct the first device to roll back the adaptation.

2. The apparatus of claim 1, wherein the system is a cyber physical system (CPS).

3. The apparatus of claim 1, wherein the adaptation corresponds to at least one of a software update, a hardware update, or a firmware update for the first device.

4. The apparatus of claim 1, wherein the programmable circuitry is to provide the adaptation to the first device via at least one of a wireless packet from a central cloud or a data packet provided via a wired connection.

5. The apparatus of claim 1, wherein the programmable circuitry is to initiate the timer value in response to the first device obtaining the adaptation message from the second device.

6. The apparatus of claim 1, wherein the programmable circuitry is to direct the first device to execute the adaptation in response to the timer value satisfying the threshold value.

7. The apparatus of claim 1, wherein the operating parameter corresponds to at least one of a task execution duration, energy usage, or resource usage.

8. The apparatus of claim 7, wherein the programmable circuitry is to determine the operating parameter is associated with the disruption by determining that the adaptation does not cause an improvement in the operating parameter.

9. The apparatus of claim 8, wherein the improvement in the operating parameter corresponds to at least one of a reduction in the task execution duration, a reduction in the energy usage, or a reduction in the resource usage.

10. A non-transitory computer readable medium comprising instructions to cause programmable circuitry to at least:
    initiate a timer value based on receipt of an adaptation message at a first device from a second device, the timer value being a function of a start-time calculated for the first device;
    compare the timer value to a threshold value;
    direct the first device to execute an adaptation identified in the adaptation message based on the timer value satisfying the threshold value; and
    when an operating parameter associated with the first device is associated with a disruption;
    send a notification to prevent further execution of the adaptation; and
    direct the first device to roll back the adaptation.

11. The non-transitory computer readable medium of claim 10, wherein the adaptation corresponds to at least one of a software update, a hardware update, or a firmware update for the first device.

12. The non-transitory computer readable medium of claim 10, wherein the instructions cause the programmable circuitry to provide the adaptation to the first device via at least one of a wireless packet from a central cloud or a data packet provided via a wired connection.

13. The non-transitory computer readable medium of claim 10, wherein the instructions cause the programmable circuitry to initiate the timer value in response to the first device obtaining the adaptation message from the second device.

14. The non-transitory computer readable medium of claim 10, wherein the instructions cause the programmable circuitry to direct the first device to execute the adaptation in response to the timer value satisfying the threshold value.

15. The non-transitory computer readable medium of claim 10, wherein the operating parameter corresponds to at least one of a task execution duration, energy usage, or resource usage.

16. The non-transitory computer readable medium of claim 15, wherein the instructions cause the programmable circuitry to determine the operating parameter is associated with the disruption by determining that the adaptation does not cause an improvement in the operating parameter.

17. The non-transitory computer readable medium of claim 16, wherein the instructions cause the programmable circuitry to determine the improvement in the operating parameter based on a difference between a first energy usage from a pre-adaptation model and a second energy usage from a post-adaptation model.

18. A non-transitory computer readable medium comprising instructions to cause programmable circuitry to at least:
    initiate a timer value based on receipt of an adaptation message at a first device from a second device, the timer value being a function of a coordination time calculated for the first device;
    compare the timer value to a threshold value;
    direct the first device to execute an adaptation identified in the adaptation message based on the timer value satisfying the threshold value; and
    when an operating parameter associated with the first device is not improved;
    send a notification to prevent further execution of the adaptation; and
    direct the first device to revert the adaptation.

19. The non-transitory computer readable medium of claim 18, wherein the adaptation corresponds to at least one of a software update, a hardware update, or a firmware update for the first device.

20. The non-transitory computer readable medium of claim 18, wherein the instructions cause the programmable circuitry to provide the adaptation to the first device via at least one of a wireless packet from a central cloud or a data packet provided via a wired connection.

21. The non-transitory computer readable medium of claim 18, wherein the instructions cause the programmable circuitry to initiate the timer value in response to the first device obtaining the adaptation message from the second device.

22. The non-transitory computer readable medium of claim 18, wherein the instructions cause the programmable circuitry to direct the first device to execute the adaptation in response to the timer value satisfying the threshold value.

23. The non-transitory computer readable medium of claim 18, wherein the operating parameter corresponds to at least one of a task execution duration, energy usage, or resource usage.

24. The non-transitory computer readable medium of claim 23, wherein the instructions cause the programmable circuitry to determine the operating parameter is not improved by determining that the adaptation does not cause a change in the operating parameter.

25. The non-transitory computer readable medium of claim 24, wherein the instructions cause the programmable circuitry to determine the change in the operating parameter based on a difference between a first resource usage from a pre-adaptation model and a second resource usage from a post-adaptation model.

26. A method to reduce disruptions in a system, the method comprising:
    initiating, by executing an instruction with processor circuitry, a timer value based on receipt of an adaptation message at a first device from a second device, the timer value being a function of a start-time calculated for the first device;
    comparing, by executing an instruction with the processor circuitry, the timer value to a threshold value;
    directing the first device to, by executing an instruction with the processor circuitry, execute an adaptation identified in the adaptation message based on the timer value satisfying the threshold value; and
    when an operating parameter associated with the first device is associated with a disruption;
        sending, by executing an instruction with the processor circuitry, a notification to prevent further execution of the adaptation; and
        directing, by executing an instruction with the processor circuitry, the first device to roll back the adaptation.

27. The method of claim 26, wherein the system is a cyber physical system (CPS).

28. The method of claim 26, wherein the adaptation corresponds to at least one of a software update, a hardware update, or a firmware update for the first device.

29. The method of claim 26, further including providing the adaptation to the first device via at least one of a wireless packet from a central cloud or a data packet provided via a wired connection.

30. The method of claim 26, further including initiating the timer value in response to the first device obtaining the adaptation message from the second device.

31. The method of claim 26, further including directing the first device to execute the adaptation in response to the timer value satisfying the threshold value.

32. The method of claim 26, wherein the operating parameter corresponds to at least one of a task execution duration, energy usage, or resource usage.

33. The method of claim 32, further including determining the operating parameter is associated with the disruption by determining that the adaptation does not cause an improvement in the operating parameter.

34. The method of claim 33, wherein the improvement in the operating parameter is based on a difference between a first task execution duration from a pre-adaptation model and a second task execution duration from a post-adaptation model.

35. An apparatus to reduce disruptions in a system, the apparatus comprising:
    interface circuitry; and
    processor circuitry including one or more of:
        at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;
        a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or
        Application Specific Integrated Circuitry (ASIC) including logic gate circuitry to perform one or more third operations;
    the processor circuitry to perform at least one of the first operations, the second operations, or the third operations to:
        initiate a timer value based on receipt of an adaptation message at a first device from a second device, the timer value being a function of a start-time calculated for the first device;
        compare the timer value to a threshold value;
        direct the first device to execute an adaptation identified in the adaptation message based on the timer value satisfying the threshold value;
        when an operating parameter associated with the first device is associated with a disruption;
            send a notification to prevent further execution of the adaptation; and
            direct the first device to roll back the adaptation.

* * * * *